US009689497B2

(12) United States Patent
Inoue

(10) Patent No.: US 9,689,497 B2
(45) Date of Patent: *Jun. 27, 2017

(54) BRUSH SEAL DEVICE

(71) Applicant: EAGLE INDUSTRY CO., LTD., Tokyo (JP)

(72) Inventor: Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/424,221

(22) PCT Filed: Feb. 6, 2014

(86) PCT No.: PCT/JP2014/052770
§ 371 (c)(1),
(2) Date: Feb. 26, 2015

(87) PCT Pub. No.: WO2014/123190
PCT Pub. Date: Aug. 14, 2014

(65) Prior Publication Data
US 2015/0354707 A1    Dec. 10, 2015

(30) Foreign Application Priority Data
Feb. 6, 2013   (JP) .................................. 2013-021525

(51) Int. Cl.
*F16J 15/3288* (2016.01)
*F16J 15/3268* (2016.01)
(Continued)

(52) U.S. Cl.
CPC ........... *F16J 15/3288* (2013.01); *F01D 11/00* (2013.01); *F02C 7/28* (2013.01); *F16J 15/3268* (2013.01);
(Continued)

(58) Field of Classification Search
CPC .. F16J 15/3288; F16J 15/3292; F16J 15/3268; F05B 2240/571; F01D 11/00; F01D 11/001; F02C 7/28; F05D 2240/56
See application file for complete search history.

(56) References Cited

U.S. PATENT DOCUMENTS 2,878,048 A  *  3/1959  Peterson ................. F16C 33/78
                                                        277/355
5,110,033 A      5/1992  Noone et al.
(Continued)

FOREIGN PATENT DOCUMENTS

EP          500486 A1      8/1992
JP       H04-318232 A     11/1992
JP       2011-169319 A     9/2011

OTHER PUBLICATIONS

International Search Report for PCT/JP2014/052770, ISA/JP, mailed Apr. 8, 2014.
(Continued)

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

The present invention is to provide a brush seal device capable of following displacement in a radial direction of a rotational shaft appropriately. The brush seal device prevents leakage of process fluid, wear of a brush seal etc., and leakage of process fluid from an outer circumferential side. The brush seal device 100 of the present invention integrally includes an inner circumferential brush seal 120 and an outer circumferential brush seal 140. The inner circumferential brush seal 120 has a brush portion 123 and an inner-circumferential-side free end portion 125 at the inner circumferential side. The outer circumferential brush seal 140
(Continued)

has a brush portion 143 and an outer-circumferential-side free end portion 145 at the outer circumferential side.

8 Claims, 17 Drawing Sheets

(51) Int. Cl.
  *F02C 7/28* (2006.01)
  *F01D 11/00* (2006.01)
(52) U.S. Cl.
  CPC ........ *F01D 11/001* (2013.01); *F05D 2240/56* (2013.01)

(56) References Cited

U.S. PATENT DOCUMENTS

| | | | |
|---|---|---|---|
| 5,114,159 A * | 5/1992 | Baird | F01D 5/10 277/355 |
| 5,176,389 A | 1/1993 | Noone et al. | |
| 7,077,573 B2 * | 7/2006 | Suh | F16C 27/02 277/355 |
| 8,317,464 B2 | 11/2012 | Alamsetty et al. | |
| 9,234,592 B2 * | 1/2016 | Inoue | F01D 11/001 |
| 2004/0012149 A1 | 1/2004 | Laurello et al. | |
| 2011/0200432 A1 | 8/2011 | Alamsetty et al. | |
| 2012/0251303 A1 | 10/2012 | Zheng et al. | |
| 2013/0001883 A1 * | 1/2013 | Addis | F16J 15/3288 277/355 |
| 2014/0301848 A1 * | 10/2014 | Valero Lafuente | F03D 11/00 416/174 |

OTHER PUBLICATIONS

Corresponding Extended European Search Report dated Feb. 8, 2016.

* cited by examiner

FIG.17
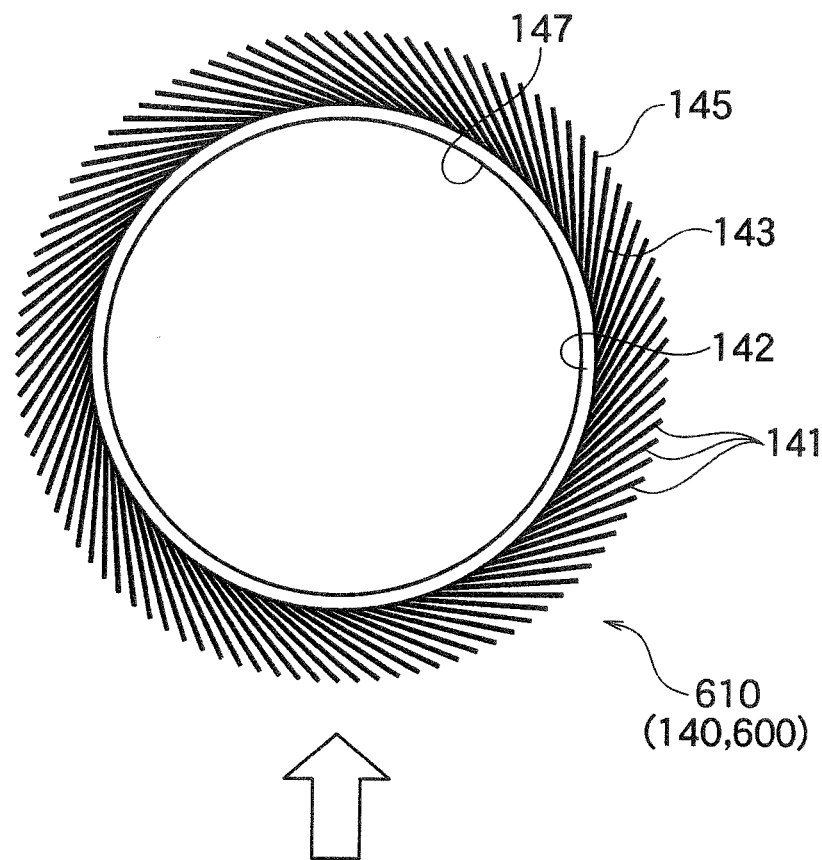
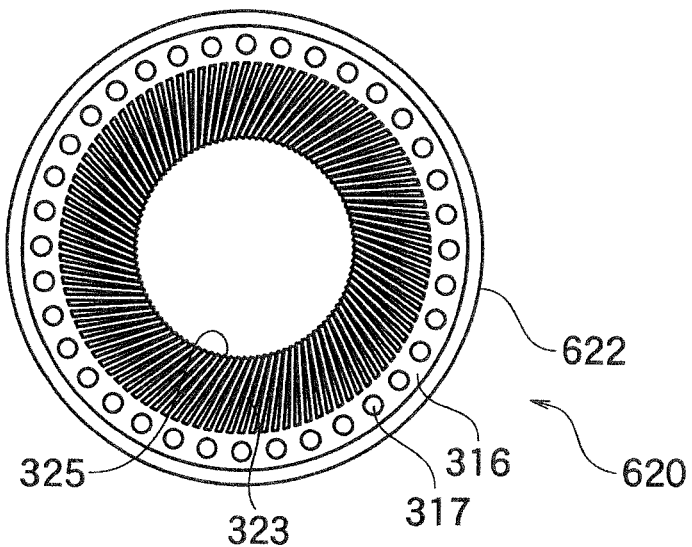

BRUSH SEAL DEVICE

CROSS-REFERENCE TO RELATED APPLICATIONS

This application is a 371 U.S. National Stage of International Application No. PCT/JP2014/052770, filed Feb. 6, 2014, which claims priority to Japanese Patent Application No. 2013-021525, filed Feb. 6, 2013. The disclosures of the above applications are incorporated herein by reference.

TECHNICAL FIELD

The present invention relates to a brush seal device which seals a clearance between a rotational shaft of such as airplanes or gas turbines and a mating component such as a housing relatively moving to the rotational shaft. The brush seal device includes a brush portion where a plurality of bristles are arranged.

BACKGROUND ART

Brush seal devices which have a brush portion made of multiple bristles are effective because the brush portion is deformed in accordance with movement of a rotational shaft and free end portions of tips of the bristles can follow a circumferential surface of the rotational shaft even if the rotational shaft is slightly moved in a radial direction.

However, when the bristles of a brush seal are pressed by movement of the rotational shaft, it is extremely difficult to control friction force applied thereto in an optimum state. This is because the friction force is affected by spring constant for elastic deformation of the bristles, complex friction force resulting from mounting structure of the bristles, and the like.

When the bristles do not properly follow the displacement of the rotational shaft, space occurs between the bristles and the rotational shaft. Then, this leads to leakage of process fluid or to an early wear of the free end portions of the bristles or a circumferential surface of the rotational shaft.

As a brush seal device to overcome such a problem, that is, as a brush seal device having a higher following ability and less wear, one having a floating-type brush seal body to enable a relatively large movement in the radial direction is lately used. Alternatively, a brush seal with a plate spring at an outer circumference, which can prevent eccentricity even if space occurs between a rotor and the brush seal due to wear thereof, is also known (for example, see Japanese Laid-Open Patent Publication No. 2011-169319 (Patent Document 1)).

However, for example, in a structure with a floating-type brush seal body or a structure with a plate spring at an outer circumference as shown in Japanese Laid-Open Patent Publication No. 2011-169319 (Patent Document 1), the outer circumference is not sufficiently sealed. Thus, a secondary seal surface is needed to prevent leakage from the outer circumference. However, in this structure, the outer circumferential side and a portion of the secondary seal are directly exposed to the outer circumferential leakage, which then increases the cost for sealing ability. In order to prevent the leakage of the secondary seal surface, a high-performance secondary seal is needed to be placed. Thus, in this respect, the cost is also increased. Further, the following ability for the rotational shaft is desired to be improved greatly.

PRIOR ART

Patent Document

Patent document 1: Japanese Laid-Open Patent Publication No. 2011-169319

SUMMARY OF THE INVENTION

Problems to be Solved by the Invention

The present invention has been achieved to solve such a disadvantage, and its object is to provide a brush seal device achieving the following advantages: The brush seal device can appropriately follow vibration, movement in a radial direction of eccentricity of a rotational shaft or the like with a proper pressure not to be excessive, and as a result, it is possible to prevent leakage of process fluid resulting from gaps between the rotational shaft and a brush seal and to prevent the wear of the brush seal, the rotational shaft, a housing or the like; the brush seal device can appropriately prevent or suppress the leakage from an outer circumferential side without a high-performance secondary seal; and the brush seal device can further appropriately maintain function and effect thereof for a long time.

Solution to Problem

In order to solve the above-mentioned problems, the brush seal device of the present invention has a brush portion in which a plurality of bristles are arranged and sealing in an axial direction between a housing and a rotational shaft, the brush seal device comprising:
an inner circumferential brush seal;
an outer circumferential brush seal; and
a connection part, wherein,
said inner circumferential brush seal comprises:
an inner-circumferential-side brush portion in which a plurality of bristles are arranged from the connection part to an inner circumferential direction; and
an inner-circumferential-side free end portion which is an inner-circumferential-side end portion of the inner-circumferential-side brush portion and is arranged opposite to an outer circumferential surface of the rotational shaft so as to contact or be adjacent to the outer circumferential surface, and
said outer circumferential brush seal comprises:
an outer-circumferential-side brush portion in which a plurality of bristles are arranged from the connection part to an outer circumferential direction; and
an outer-circumferential-side free end portion which is an outer-circumferential-side end portion of the outer-circumferential-side brush portion and is arranged opposite to an inner circumferential surface of the housing so as to contact or be adjacent to the inner circumferential surface.

According to the present invention, the following brush seal device can be provided: The brush seal device can appropriately follow vibration, movement in a radial direction of eccentricity of a rotational shaft or the like with a proper pressure not to be excessive, and as a result, it is possible to prevent leakage of process fluid resulting from gaps between the rotational shaft and a brush seal and to prevent the wear of the brush seal, the rotational shaft, a housing or the like; the brush seal device can appropriately prevent or suppress the leakage from an outer circumferential side without a high-performance secondary seal; and the brush seal device can further appropriately maintain function and effect thereof for a long time.

Preferably, at least one of said inner circumferential brush seal and said outer circumferential brush seal is a brush seal having a seal part and the free end portion formed on one end portion of a plurality of wire members bundled and arranged in a wall shape along a circumference and formed into a ring shape by welding the other end portion of the wire members combined to one another.

Also, preferably, at least one of said inner circumferential brush seal and said outer circumferential brush seal comprises a plurality of plate brush seal unit discs integrally formed by axially laminating themselves, which include the inner-circumferential-side brush portion and the outer-circumferential-side brush portion having narrow beams as the bristles extending from the connection part and inclined with respect to a circumferential direction.

Also, preferably, the inner circumferential brush seal and the outer circumferential brush seal comprise a plurality of wire members to form a ring shape by welding each middle part of the wire members combined to one another, so that outer and inner circumferential sides of the welding parts are defined as the outer and inner circumferential brush seals, respectively.

Also, preferably, the brush seal device of the present invention comprises plate brush seal unit discs laminated, wherein the plate brush seal unit disc comprises:

the inner circumferential brush seal provided with the inner-circumferential-side free end portion and the inner-circumferential-side brush portion having narrow beams as the bristles extending from the connection part to an inner circumferential side and inclined with respect to a circumferential direction of the plate brush seal unit disc;

the outer circumferential brush seal provided with the outer-circumferential-side free end portion and the outer-circumferential-side brush portion having narrow beams as the bristles extending from the connection part to an outer circumferential side and inclined with respect to a circumferential direction of the plate brush seal unit disc; and a base portion in which the connection parts of the inner circumferential brush seal and the outer circumferential brush seal are formed integrally.

Also, preferably, the inner circumferential brush seal and the outer circumferential brush seal are composed of bristles of the same material.

Also, preferably, the inner circumferential brush seal and the outer circumferential brush seal comprise the inner-circumferential-side brush portion and the outer-circumferential-side brush portion respectively, which are composed of bristles of different materials.

Also, preferably, a plurality of the bristles of the inner-circumferential-side brush portion of the inner circumferential brush seal are arranged to be inclined with respect to a radial direction, a plurality of the bristles of the outer-circumferential-side brush portion of the outer circumferential brush seal are arranged to be inclined with respect to a radial direction, and the bristles of the inner circumferential brush seal and the bristles of the outer circumferential brush seal are inclined oppositely with respect to the radial direction.

Also, preferably, the brush seal device further comprises a brush receiving part placed on the inner circumferential surface of the housing so as to contact or be adjacent to the outer-circumferential-side free end portion of the outer circumferential brush seal and to restrict a spreading out in an axial direction of the outer-circumferential-side free end portion of the outer circumferential brush seal.

Also, preferably, the outer circumferential brush seal is formed to be inclined with respect to the axial direction of the rotational shaft.

BRIEF EXPLANATION OF THE DRAWINGS

FIG. 17 is a cross sectional view showing a structure of a brush seal device of the sixth embodiment of the present invention.

MODES FOR CARRYING OUT THE INVENTION

First Embodiment

A brush seal device 100 of the first embodiment of the present invention will be explained in reference to FIG. 1 to FIG. 4.

Figure 1:
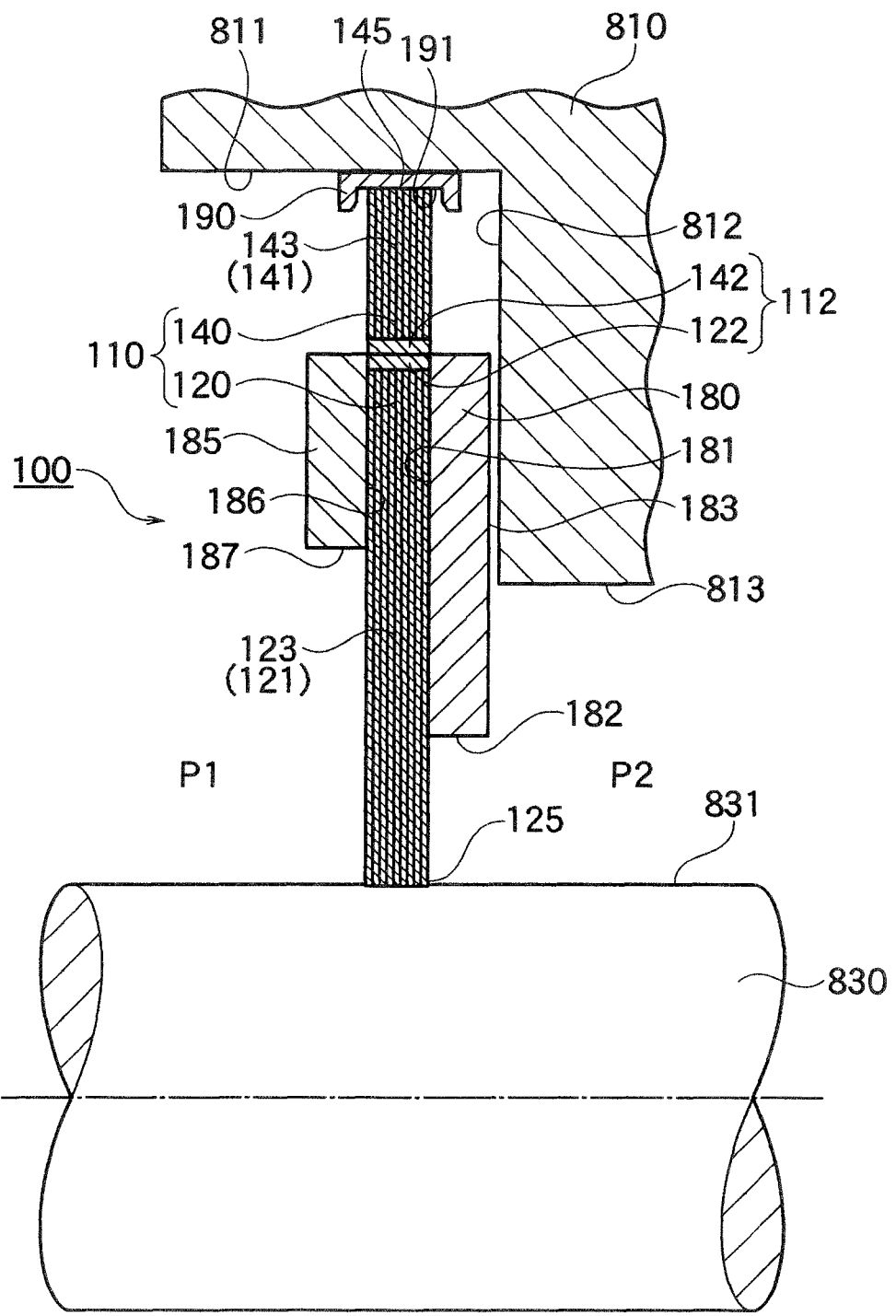
FIG. 1 is a cross sectional view showing a structure of a brush seal device of the first embodiment of the present invention.

As shown in FIG. 1, the brush seal device 100 of the present embodiment is used to be arranged in a gas turbine, for example. The brush seal device 100 divides a gap between a housing 810 and a rotational shaft 830 into a higher pressure side P1 and a lower pressure side P2.

The brush seal device 100 is attached to a step shoulder 812 provided on an inner circumferential surface 811 of the housing 810. The brush seal device 100 has inner-circumferential-side free end portions 125 and an outer-circumferential-side free end portions 145, which are formed as free end portions respectively on an inner circumference and an outer circumference of a brush seal 110. The inner-circumferential-side free end portion 125 is arranged opposite to an outer circumferential surface 831 of a rotational shaft 830 so as to contact or be adjacent to the outer circumferential surface 831. The outer-circumferential-side free end portions 145 are arranged opposite to the inner circumferential surface 811 of the housing 810 so as to touch or be adjacent to the inner circumferential surface 811. With such a structure and arrangement, the brush seal device 100 seals process fluid at the higher pressure side P1.

As main components, the brush deal device 100 has the brush seal 110, a back plate part 180, a holding part 185, and a brush receiving part 190. Further, the brush seal 110 has an inner circumferential brush seal 120 and an outer circumferential brush seal 140.

Figure 2A:
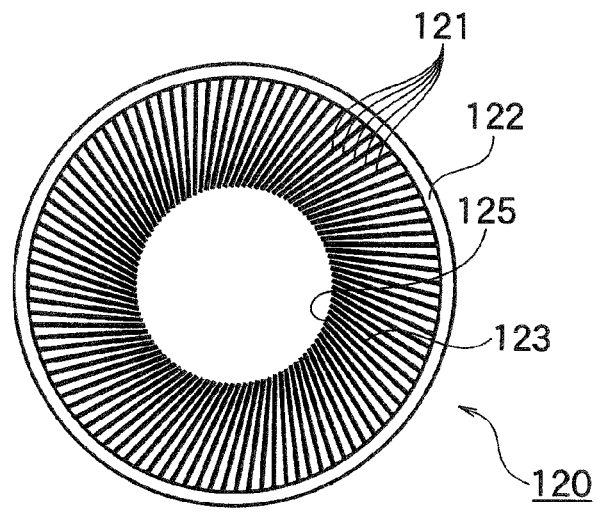
FIG. 2A is a plane view of an inner circumferential brush seal providing a brush seal of the brush seal device shown in FIG. 1.

As shown in FIG. 1 and FIG. 2A, the inner circumferential brush seal 120 is formed into a ring shape by bundling multiple linear bristles 121, arranging the bundled bristles 121 in a wall shape along a circumference, and bonding an outer circumferential side with welding. A ring-shaped welding part at the outer circumferential side is formed as an attachment section 122. An inner circumferential side thereof is formed as a brush portion 123. End portions at the inner circumferential side are formed as the free end portions 125, which contact or are adjacent to the outer circumferential surface 831 of the rotational shaft 830.

Figure 3:
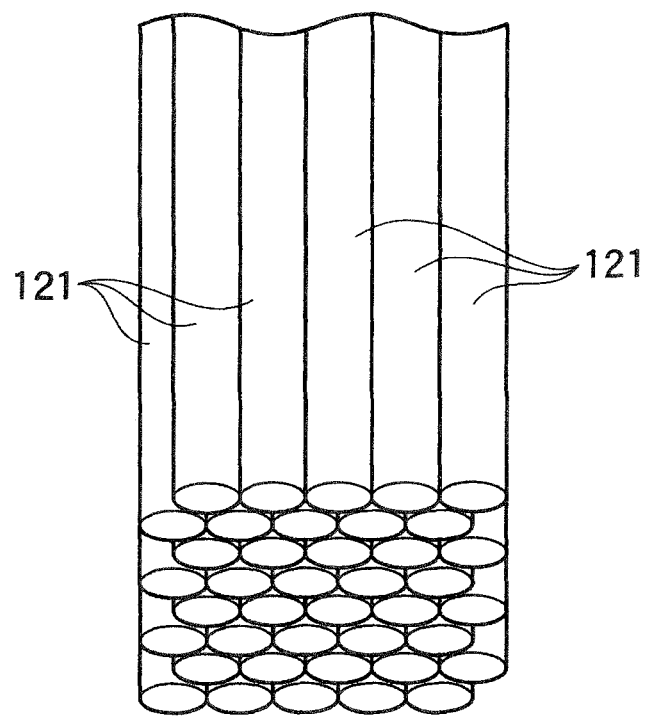
FIG. 3 is a perspective view showing a form of an inner-circumferential-side free end portion of an inner circumferential brush seal of the brush seal device shown in FIG. 1.

As shown in FIG. 2A, each of the bristles 121 has a linear shape and is arranged to be inclined toward the rotational direction of the rotational shaft 830 with respect to a radial direction of the rotational shaft 830 at a predetermined angle. When the brush seal device 100 is installed on an actual apparatus and used, the rotational shaft 830 is fitted with inside of the inner-circumferential-side free end portions 125 of the inner circumferential brush seal 120 arranged in such a way. The inner-circumferential-side free end portions 125 of the bristles 121 of the inner circumferential brush seal 120, which form an engagement surface (engagement part) with the rotational shaft 830, are arranged orderly and densely so as not to make a blank space as much as possible and are subjected to a precision finish as shown in FIG. 3.

In the present embodiment, the bristles 121 are made of steel, nickel-base alloy, or ceramic material etc., and are wire members whose cross sections are circular. The diameter of the bristle 121 is 0.5 to 0.005 mm, and preferably 0.20 to 0.02 mm.

Note that, the bristle 121 may have an optional shape on the presumption that function, movement, or effect etc. described in the present specification can be demonstrated. For example, the bristle 121 may be a member having an optional cross sectional form other than a circular shape such as a wire member having a rectangular cross section, or may be a member having a diameter other than the above range. Also, the bristle may be one whose cross sectional shape, cross sectional size (diameter) or the like changes. Further, the bristles 121 may be used by mixing some bristles having such a different shape or form in multiple bristles.

Figure 2B:
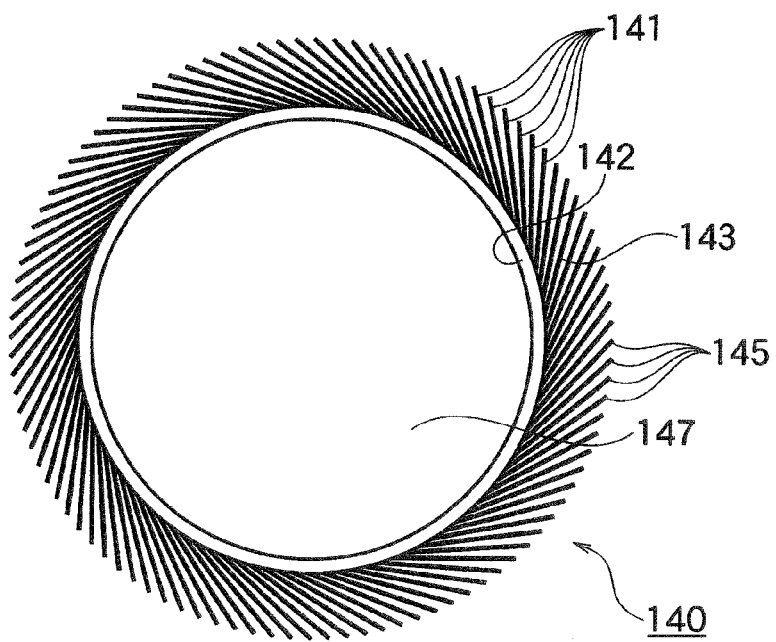
FIG. 2B is a plane view of an outer circumferential brush seal providing a brush seal of the brush seal device shown in FIG. 1.

As shown in FIG. 1 and FIG. 2B, the outer circumferential brush seal 140 is formed into a ring shape by bundling the multiple linear bristles 141, arranging the bundled bristles 141 in a wall shape along the circumference, and bonding the inner circumferential side with welding. A ring-shaped welding part at the inner circumferential side is formed as an attachment section 142. The outer circumferential side thereof is formed as a brush portion 143. The ends of the bristles 141 at the outer circumferential side are formed at the free end portions 145, which contact or are adjacent to the inner circumferential surface 811 of the housing 810. The arrangement density and arrangement form of the bristles 141 are substantially the same as those of the above-mentioned the bristles 121 of the inner circumferential brush seal 120.

As shown in FIG. 2B, each of the bristles 141 has a linear shape and is arranged to be inclined along a circumferential direction of the inner circumferential surface 811 of the housing 810 with respect to the radial direction of the inner circumference of the housing 810 at a predetermined angle. Also, the bristles 141 are inclined in the direction opposite to the direction where the bristles 121 of the inner circumferential brush seal 120 are inclined along the circumferential direction, with respect to the radial direction of the rotational shaft 830. Note that, function and effect of such a structure will be mentioned later.

The outer-circumferential-side free end portions 145 of the bristles 141 of the outer circumferential brush seal 140, which are engaged with the inner circumferential surface 811 of the housing 810, have some space with one to another because they are arranged closer to outer circumferential than the attachment section 142. However, in the same way as the bristles 121 of the inner circumferential brush seal 120 shown in FIG. 3, the outer-circumferential-side free end portions 145 are arranged orderly and densely so as not to make the space as much as possible, and are subjected to a precision finish. The outer-circumferential-side free end portions 145 of the outer circumferential brush seal 140 arranged in this way are positioned to contact and slide on the inner circumferential surface 811 of the housing 810 with the brush receiving part 190 therebetween.

In the present embodiment, the bristles 141 are the same as the bristles 121 of the inner circumferential brush seal 120 mentioned above. That is, the bristles 141 are made of steel, nickel-base alloy, or ceramic material etc., and are wire members whose cross sections are circular. The diameter of the bristle 141 is 0.5 to 0.005 mm, and preferably 0.20 to 0.02 mm. Also, a form of deformability of the bristles 141 is the same as that of the bristles 121 mentioned above.

In the present embodiment, the brush portion 143 of the outer circumferential brush seal 140 is substantially the same one as the brush portion 123 of the inner circumferential brush seal 140. That is, each of the bristles 121 and 141 has the same material, shape (cross sectional shape), diameter and the like, and further has the same characteristic such as elastic characteristic. Also, the bristles 141 have substantially the same arrangement density and arrangement form as those of the bristles 121 of the inner circumferential brush seal 120. Note that, tilt angle, tilt direction, and length of the bristles are different between the bristles 141 of the outer circumferential brush seal 140 and the bristles 121 of the inner circumferential brush seal 120.

Here, when a term "brush portion is the same" is described in the present invention and the present specification, the meaning of the term shall be shown from an embodiment which is substantially equal to a typical one mentioned below as the second embodiment: The inner circumferential brush seal 120 and the outer circumferential brush seal 140 are respectively defined as the inner circumferential side and the outer circumferential side by welding the middle of the bristles. Thus, the meaning of having the same brush portions includes the following differences: Length of the bristles at the inner and outer circumferences; the tilt angle and tilt direction of the respective bristles at the inner and outer circumferences regarding the process of before/after welding and the like. From such a perspective, although the brush portion 143 of the outer circumferential brush seal 140 and the brush portion 123 of the inner circumferential brush seal 120 in the present embodiment are different in the tilt angles, tile directions, and the length of the bristles 121 and the bristles 141, they have the same material, shape (cross sectional shape), diameter, characteristic such as elastic characteristic, arrangement density, and arrangement form. Thus, they are meant by substantially the same brush portions.

A ring space 147 (see FIG. 2B), which is the inside of the attachment section 142 of the outer circumferential brush seal 140, is a mounting part of the inner circumferential brush seal 120. The inner-side ring space 147 of the outer circumferential brush seal 140 is formed to have approximately the same inner diameter as the outer circumference of the inner circumferential brush seal 120 so that the inner circumferential brush seal 120 can be fitted inside thereof. In other words, the inner circumferential brush seal 120 is formed to have approximately the same outer diameter as the inner diameter of the inner-side ring space 147 of the outer circumferential brush seal 140 and to be fitted with the ring space 147 of the outer circumferential brush seal 140.

Figure 4:
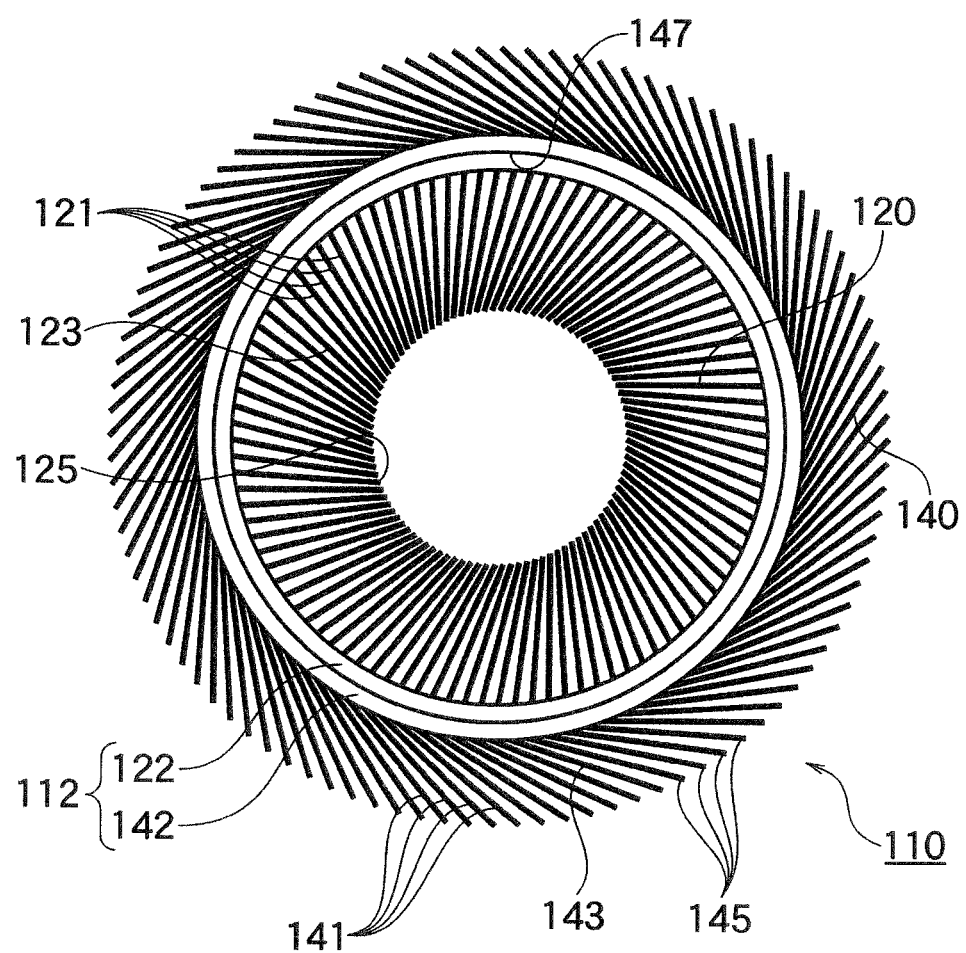
FIG. 4 is a plane view of a brush seal formed by engaging the inner circumferential brush seal shown in FIG. 2A and the outer circumferential brush seal shown in FIG. 2B.

Then, as shown in FIG. 4, the brush seal 110 is constituted by fitting and placing the inner circumferential brush seal 120 to the ring space 147 of the outer circumferential brush seal 140. The outer circumferential brush seal 140 and the inner circumferential brush seal 120 are integrated by joining the attachment section 142 and the attachment section 122 as a connection part 112 by welding or so, and are formed as the brush seal 110.

As shown in FIG. 1, the back plate part 180 is an annular plate member placed at the lower pressure side P2 of the brush seal 110. The back plate part 180 is placed so that a side surface 181 is contacted to the bristles 121 of the inner circumferential brush seal 120 of the brush seal 110 and supports the bristles 121 from the lower pressure side P2 to receive pressure of process fluid.

An opening 182, which makes the rotational shaft 830 go through, is formed on the central position of the back plate part 180. The opening 182 has a diameter which is large enough not to be contacted even if the rotational shaft 830 moves in the axial direction due to vibration or eccentricity etc. thereof. On the other hand, from a perspective of supporting the bristles 121 appropriately and preventing leakage of the process fluid, the opening 182 is formed to have a diameter which is smaller than that of an inner-side inner circumferential surface 813 of the step shoulder 812 of the housing 810 or an opening 187 of the holding part 185 mentioned later.

Note that, the side surface 183 at the lower pressure side P2 of the back plate part 180 may be constituted as a secondary seal surface where a secondary seal (not shown) is formed between the brush seal device 100 and the housing 810.

The holding part 185 is an annular plate member placed at the higher pressure side P1 of the brush seal 110. In the holding part 185, a side surface 186 is placed to be contacted to the bristles 121 of the inner circumferential brush seal 120 of the brush seal 110, and an opening 187 for making the rotational shaft 830 go through is formed on the central position thereof. The opening 187 is formed to have a diameter which is sufficiently larger than that of the opening 182 of the back plate part 180 in order to respond to such as deformation of the bristles 121 when the rotational shaft 830 contacts to the inner circumferential brush seal 120 of the brush seal 110, the contact state is changed, or the like due to vibration, eccentricity or so.

The back plate part 180 and the holding part 185 are integrally formed with the brush seal 110 to hold it therebetween.

Especially, in the present embodiment, as shown in FIG. 1, the back plate part 180 and the holding part 185 are constituted to hold the inner circumferential brush seal 120 of the brush seal 110. That is, the back plate part 180, the attachment section 122 of the inner circumferential brush seal 120, and the holding part 185 are welded so that the attachment section 122 of the inner circumferential brush seal 120 is positioned at center, and they are combined as in the trinity.

Note that, in such a structure, the whole brush seal device 100 may be constituted by inserting the inner circumferential brush seal 120, which is integrated with the back plate part 180 and the holding part 185, into the ring space 147 of the outer circumferential brush seal 140 and by bonding the outer circumferential brush seal 140 to the outer circumferential side of the inner circumferential brush seal 120. Alternatively, the whole brush seal device 100 may be constituted by bonding the back plate part 180 and the holding part 185 to both side of the inner circumferential brush seal 120 of the brush seal 110 after the brush seal 110 is formed by attaching the inner circumferential brush seal 120 to the ring space 147 of the outer circumferential brush seal 140 as mentioned above and bonding it.

Also, not shown, the back plate part 180 and the holding part 185 may hold the brush seal 110, where the inner circumferential brush seal 120 and the outer circumferential brush seal 140 are integrated. That is, the back plate part 180, the brush seal 110, where the inner circumferential brush seal 120 and the outer circumferential brush seal 140 are integrated, and the holding part 185 may be welded so that the connection part 112 of the brush seal 110 is positioned at center, and they may be integrated.

The back plate part 180 and the holding part 185 are manufactured by an optional material such as nickel-base alloy, iron, steel, or other nonferrous metals. In terms of the back plate part 180 and the holding part 185, a preferable material is properly selected by considering such as type, temperature or other conditions of process fluid, or material or structure of the bristles 121 or the attachment section 122 of the inner circumferential brush seal 120.

The brush receiving part 190 is a cylindrical member engaged and placed on a portion of the inner circumferential surface 811 of the housing 810, where the brush seal device 100 is arranged, and is a spreading restriction member for restricting spreading of the outer-circumferential-side free end portions 145 of the bristles 141 of the outer circumferential brush seal 140. A concave 191 is formed on the brush receiving part 190 toward the inner diameter direction, that is, on the inner circumferential surface thereof. The concave 191 is a passage where the outer-circumferential-side free end portions 145 of the outer circumferential brush seal 140 are arranged to be close to, contact to, or slide to the concave 191. Both ends in the axial direction of the concave 191 annularly protrude to the inside in the radial direction, and restrict the movement of the outer-circumferential-side free end portions 145 of the outer circumferential brush seal 140 so that they do not protrude to the outside of the concave 191.

The above-mentioned brush receiving part 190 is placed against the outer-circumferential-side free end portions 145 of the outer circumferential brush seal 140, so that it is possible to restrict spreading of the outer-circumferential-side free end portions 145 of the bristles 141 of the outer circumferential brush seal 140 and to enable the outer-circumferential-side free end portions 145 to be arranged orderly and densely for a long time. In particular, as the present embodiment shown in FIG. 1, the brush seal device 100 with no structure corresponding to the back plate part 180 and the holding part 185 for the outer circumferential brush seal 140 has a possibility that the outer-circumferential-side free end portions 145 of the outer circumferential brush seal 140 are spread (especially, to the radial direction). However, the brush receiving part 190 is provided, so that the outer-circumferential-side free end portions 145 can be prevented from spreading. As a result, it is possible to prevent lowering of eccentricity prevention function of the brush seal device 100 caused by spreading of the outer-circumferential-side free end portions 145 of the outer circumferential brush seal 140 and to enable the brush seal device 100 to be properly operated for a long time.

Also, with the brush receiving part 190, it is possible to prevent wear of the inner circumferential surface 811 of the housing 810 caused by closely sliding the outer-circumferential-side free end portions 145 of the outer circumferential brush seal 140 on the inner circumferential surface 811 of the housing 810.

As with the back plate part 180 and the holding part 185, the brush receiving part 190 is also made from an optional material such as nickel-base alloy, iron, steel, or other nonferrous metals, and a preferable material may be properly selected by considering type, temperature or other conditions of process fluid. However, as the brush receiving part 190, it is especially preferably made from a material having a strong friction resistance, and a preferable material is properly selected in accordance with the material of the bristles 141 or a condition of contacting or sliding etc.

Note that, the brush seal device 100 is usually arranged in a condition where the outer-circumferential-side free end portions 145 are contacted to the inner circumferential surface 811 of the housing 810 and in a condition where the inner-circumferential-side free end portions 125 are contacted or closed to the outer circumferential surface 831 of the rotational shaft 830. However, if at least one of the inner-circumferential-side free end portions 125 and the outer-circumferential-side free end portions 145 are contacted to the outer circumferential surface 831 of the rotational shaft 830 and the inner circumferential surface 811 of the housing 810, a position in the radial direction of the brush seal device 100 is substantially specified. Therefore, the brush seal device 100 may be mounted on an apparatus in an optional form as long as it has a structure, that is, either or both the inner-circumferential-side free end portions 125 and the outer-circumferential-side free end portions 145 of the brush seal device 110 are contacted to the outer circumferential surface 831 of the rotational shaft 830 and the inner circumferential surface 811 of the housing 810.

Further, during operation, or when other engagement means or supporting means (e.g., means for defining only a position in the axial direction of the brush seal device 100) is provided, both the inner-circumferential-side free end portions 125 and the outer-circumferential-side free end portions 145 may be temporarily close to the outer circumferential surface 831 of the rotational shaft 830 and the inner circumferential surface 811 of the housing 810. Namely, the inner-circumferential-side free end portions 125 and the outer-circumferential-side free end portions 145 may be temporarily floated from the outer circumferential surface 831 and the inner circumferential surface 811. That structure shall be within a scope of the present invention, and that movement shall also be within expectation.

The brush seal device 100 of the present embodiment with such a structure further provides the outer circumferential brush seal 140 at the outer circumference side of the inner circumferential brush seal 120. Thus, it is possible to seal process fluid at the outer circumferential side of the brush seal device 100 and to properly prevent leakage of process fluid from the outer circumferential side of the brush seal device 100.

As a result, a secondary seal provided for preventing leakage of the process fluid at the outer circumferential side of the brush seal device 100 can be unnecessary.

When using the secondary seal simultaneously, it is also possible to properly prevent leakage of the process fluid from a secondary seal surface, to reduce stress of the secondary seal, and to extend its life. Further, it is possible to prevent enhancement of performance required for the secondary seal and to obtain effect such as reduction in cost of devices.

Also, since the brush seal device 100 of the present embodiment has a two-stage brush seal of the inner circumferential brush seal 120 and the outer circumferential brush seal 140, it is possible to improve elastic characteristic (spring property) of the whole brush seal device 100. As a result, even if there is a risk that a space occurs between the rotational shaft 830 and the inner-circumferential-side free end portions 125 of the inner circumferential brush seal 120 due to eccentricity of the rotational shaft 830 or wear of the brush seal (the inner circumferential brush seal 120) etc., the inner circumferential brush seal 120 can properly keep following to the outer circumferential surface 831 of the rotational shaft 830. As a result, it is possible to prevent such a space from occurring and to properly prevent leakage of process fluid.

In the brush seal device 100 of the present embodiment, the bristles 141 of the outer circumferential brush seal 140 are also formed to be inclined with respect to the inner circumferential surface 811 of the housing 810 and the axial direction of the rotational shaft 830, and the brush portion 143 of the outer circumferential brush seal 140 also has eccentricity prevention function based on elastic deformation. As a result, the brush seal device 100 as a whole can more preferably perform eccentricity prevention function for the rotational shaft 830. That is, it is possible to reduce a risk that a space occurs between the rotational shaft 830 and the inner-circumferential-side free end portions 125 of the inner circumferential brush seal 120 and to more preferably perform alignment of the rotational shaft 830 for the brush seal device 100 as a whole.

In the brush seal device 100 of the present embodiment, it is possible to optionally adjust length and angle of the bristles 121 and 141 for each of the inner circumferential brush seal 120 and the outer circumferential brush seal 140. Therefore, it is possible to respectively adjust eccentricity prevention function performed at the inner circumferential brush seal 120 and the outer circumferential brush seal 140 to a proper operation state. In this respect, the brush seal device 100 as a whole can more preferably perform eccentricity prevention function for the rotational shaft 830, and can preferably perform alignment of the rotational shaft 830.

In the brush seal device 100 of the present embodiment, the bristles 141 of the outer circumferential brush seal 140 and the bristles 121 of the inner circumferential brush seal 120 are inclined in different directions with respect to the radial direction of the rotational shaft 830. That structure makes it possible to generate a force of the outer circumferential brush seal 140 in a direction opposite to the direction of a force of the inner circumferential brush seal 120 generated by the rotation of the rotational shaft 830. Thus, each of the inner circumferential brush seal 120 and the outer circumferential brush seal 140 can be made harder to be rotated. As a result, wear due to sliding of the inner-circumferential-side free end portions 125 and the outer-circumferential-side free end portions 145 of the brush seal 110 is reduced, and the brush seal device 100 can be properly maintained for a long time.

In the brush seal device 100 of the present embodiment, the bristles 121 and the bristles 141 are formed on the inner circumferential brush seal 120 and the outer circumferential brush seal 140 by joining and welding the outer circumferential side or the inner circumferential side, respectively. Joining and welding the bristles 121 and 141 to provide them as the above make it almost certainly possible to prevent the bristles 121 and 141 from falling off and to form the strong brush portions 123 and 143. As a result, the brush seal device 100 can be properly maintained for a long time.

Although the brush seal device 100 of the present embodiment has the two-stage brush seal of the inner circumferential brush seal 120 and the outer circumferential brush seal 140, it is extremely easy to be handled because the brush seal 110 is integrally formed by joining the attachment section 122 and the attachment section 142 as the connection part 112. Therefore, the brush seal device 100 of the present embodiment can be arranged, detached, adjusted or the like as easily as conventional ordinary brush seal devices having single brush seal.

In this respect, in the present embodiment, the inner circumferential brush seal 120 and the outer circumferential brush seal 140 are integrated as the brush seal 110 by joining them, it is further integrated with the back plate part 180 and the holding part 185 or so, and thereafter, it is placed between the housing 810 and the rotational shaft 830. However, the inner circumferential brush seal 120 and the outer circumferential brush seal 140 may be integrated at the time of assembling.

That is, the brush seal 110 may be realized as follows: A member of the inner circumferential brush seal 120 held by the back plate part 180 and the holding part 185 therebetween and the outer circumferential brush seal 140 are separately prepared (here, the brush receiving part 190 is not explained); and the inner circumferential brush seal 120 (the inner circumferential brush seal 120 held by the back plate part 180 and the holding part 185 therebetween) is inserted into the ring space 147 of the outer circumferential brush seal 140 and joined when the brush seal device 100 is placed between the housing 810 and the rotational shaft 830.

In the brush seal device 100 of the present embodiment, since the inner circumferential brush seal 120 and the outer circumferential brush seal 140 can be also easily joined, the way mentioned above also makes it possible to place and realize the brush seal 110 and to place it in a properly convenient form based on a condition or state etc. of an apparatus to be placed (the housing 810 and the rotational shaft 830).

In the above embodiment, the inner circumferential brush seal 120 and the outer circumferential brush seal 140 of the brush seal 110 have the same brush portions 123 and 143. However, the inner circumferential brush seal 120 and the outer circumferential brush seal 140, which have the different brush portions 123 and 143, may be used. This is because the brush seal device 100 of the present embodiment comprises the brush seal 110, where the separately composed inner and outer circumferential brush seals 120 and 140 are connected by the connection part 112 composed of the attachment section 122 and the attachment section 142 as mentioned above. That is, the inner circumferential brush seal 120 and the outer circumferential brush seal 140 may constitute the brush portions 123 and 143 with the bristles 121 and 141, which have different material, diameter, shape (cross sectional shape), characteristic, arrangement density, arrangement form, or the like.

In accordance with the above-mentioned constitution, it is possible to compose the brush portions 123 and 143 having various movement conditions and movement characteristics for the inner circumferential brush seal 120 and the outer circumferential brush seal 140. It is also possible to form the brush portions 123 and 143 having optimum conditions respectively. As a result, it is possible to provide a brush seal device which is applicable to a wider technical field and performs a higher performance.

Note that, as mentioned above, when the inner circumferential brush seal 120 and the outer circumferential brush seal 140 have the different brush portions 123 and 143, they may be integrated before the brush seal device 100 is placed in the housing 810, or they may be separated until the brush seal device 100 is placed in the housing 810 and be integrated when they are placed in the housing 810 (when they are assembled).

In the present embodiment, a ring member whose cross section is concave is used as the brush receiving part 190. However, parts defining a range of the outer-circumferential-side free end portions 145 of the outer circumferential brush seal 140 may be just placed at both sides of the range in the axial direction on the inner circumferential surface 811 of the housing 810. As the brush receiving part 190, an optional one may be used as long as it can restrict spreading of the outer-circumferential-side free end portions 145 of the outer circumferential brush seal 140.

Accordingly, according to the first embodiment of the present invention, the following brush seal device 100 is provided: Leakage of process fluid from around a rotational shaft and from an outer circumferential side can be prevented; wear of a brush seal, the rotational shaft, or a housing etc. can be prevented; and these function and effect can be properly maintained for a long time.

Second Embodiment

A brush seal device 200 according to the second embodiment of the present invention will be explained in reference to FIG. 5 to FIG. 7.

In the following explanation regarding the brush seal device 200 of the second embodiment, the same reference number will be distributed to structures which are substantially the same as those of the brush seal device 100 etc. of the first embodiment mentioned above in reference to FIG. 1 to FIG. 4, and the structures will not be explained. In the second embodiment, parts which are different from those of the brush seal device 100 of the first embodiment will be mainly explained.

Figure 5:
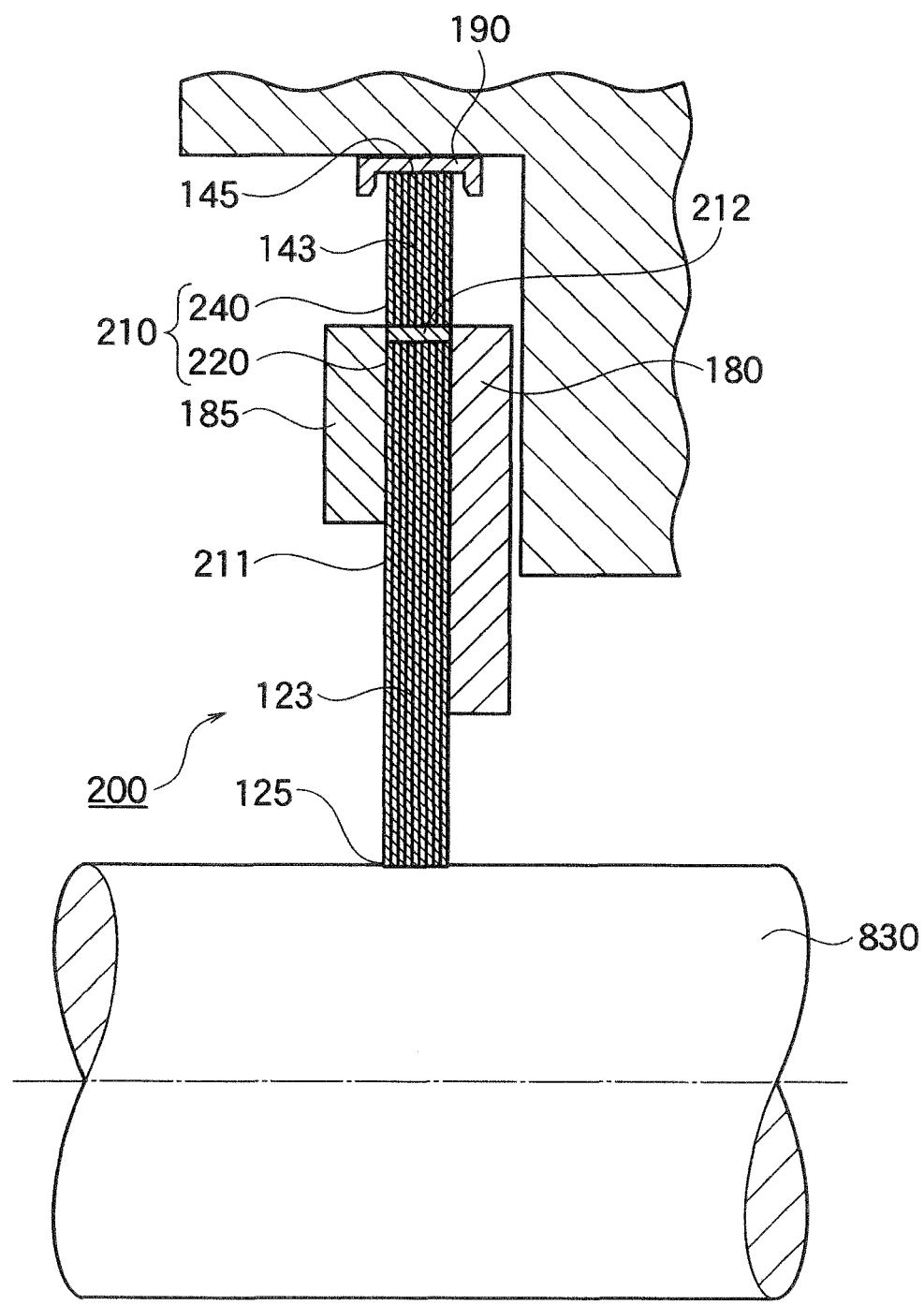
FIG. 5 is a cross sectional view showing a structure of a brush seal device of the second embodiment of the present invention.
Figure 6:
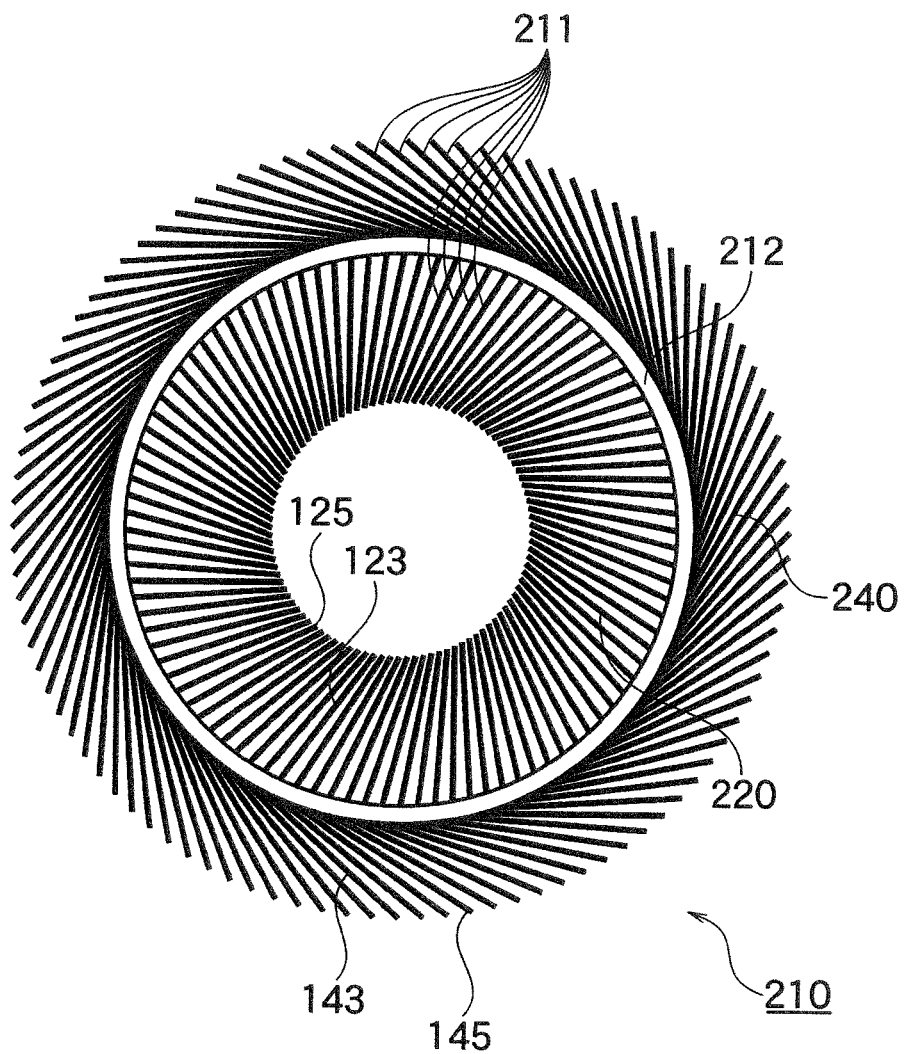
FIG. 6 is a plane view of a brush seal of the brush seal device shown in FIG. 5.

As shown in FIG. 5 and FIG. 6, the brush seal device 200 of the second embodiment basically has the same structures as the brush seal device 100 of the first embodiment. That is, the brush seal device 200 includes a brush seal 210, the back plate part 180, the holding part 185, and the brush receiving part 190. Also, the brush seal 210 includes an inner circumferential brush seal 220 and an outer circumferential brush seal 240. The inner circumferential brush seal 220 has the brush portion 123 and the free end portions 125 at the inner circumferential side. The outer circumferential brush seal 240 has the brush portion 143 and the free end portions 145 at the outer circumferential side.

The brush seal device 200 of the second embodiment is different from the brush seal device 100 of the first embodiment in the structure of the brush seal 210.

In the above-mentioned brush seal device 100 of the first embodiment, as explained above in reference to FIG. 2 and FIG. 4, the brush seal 110 is provided by separately forming the inner circumferential brush seal 120 having the bristles 121 and the outer circumferential brush seal 140 having the bristles 141, and by connecting the attachment section 122 of the inner circumferential brush seal 120 and the attachment section 142 of the outer circumferential brush seal 140 as the connection part 112.

On the other hand, the brush seal device 200 of the second embodiment is formed by welding a middle part 212 of bristles 211 to define the inner and outer circumferential sides as the inner circumferential brush seal 220 and the outer circumferential brush seal 240, respectively.

Figure 7A:
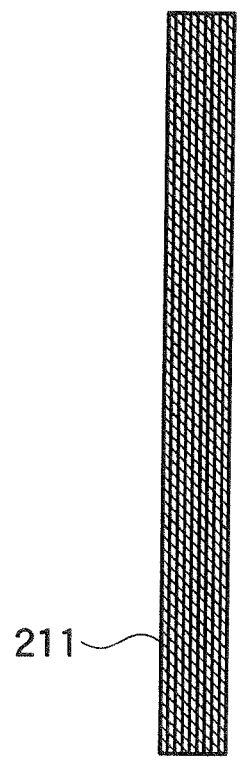
FIG. 7A is a view to explain a forming method and structure of the brush seal device shown in FIG. 5, and the view shows bundled bristles before welding.
Figure 7B:
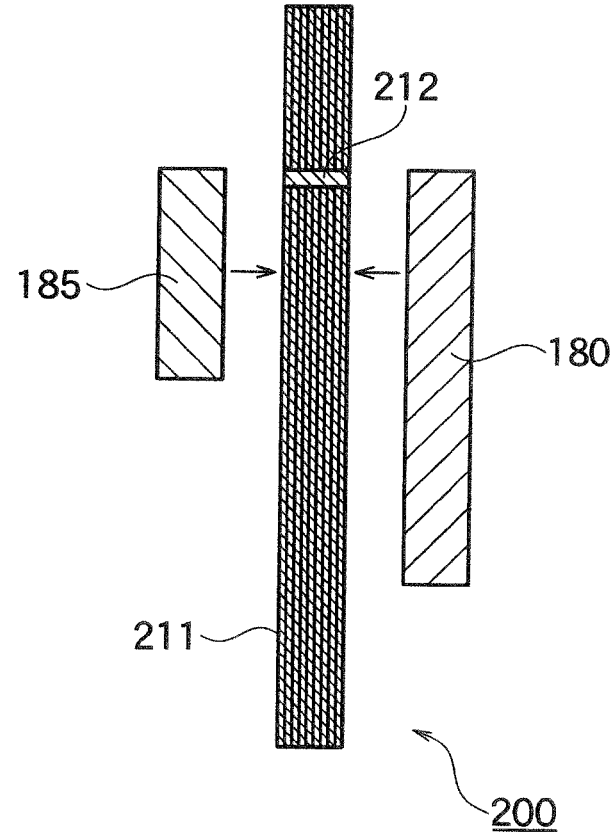
FIG. 7B is a view to explain a forming method and structure of the brush seal device shown in FIG. 5, and the view shows a step for placing a back plate part and a holding part by welding a middle part of the bundled bristles.

That is, the brush seal 210 is formed as a ring shape by bundling the multiple bristles 211 and arranging them along the circumference in a wall shape as shown in FIG. 7A, and by welding the middle part 212 of the bristles 211 and mutually combining the plurality of the bristles 211 as shown in FIG. 7B.

Then, the back plate part 180 and the holding part 185 are welded to the attachment section 212 to be integrated with the brush seal 210, so that the brush seal device 200 is obtained. The attachment section 212 of the brush seal 210 is the welding part 212 of the middle part of the bristles 211.

By such a structure and manufacturing method, the brush seal device 200 is formed as follows: the inner circumferential side of the attachment section 212 is formed as the inner circumferential brush seal 220 having the brush portion 123 and the inner-circumferential-side free end portions 125; and the outer circumferential side of the attachment section 212 is formed as the outer circumferential brush seal 240 having the brush portion 143 and the outer-circumferential-side free end portions 145.

Note that, in order to employ such a structure, the bristles 211 initially prepared in the brush seal device 200 have a length approximately equal to a length obtained by adding a length of the bristles 121 of the inner circumferential brush seal 120 and a length of the bristles 141 of the outer circumferential brush seal 140 in the brush seal device 100 of the first embodiment.

In the brush seal device 200 of the second embodiment, as with the inner circumferential brush seal 120 and the outer circumferential brush seal 140 of the brush seal device 100 of the first embodiment, the bristles 211 of the brush seal 210 are also respectively inclined with respect to the circumferential direction or the radial direction of the brush seal 210 at a predetermined angle at a portion defining the inner circumferential brush seal 220 and at a portion defining the outer circumferential brush seal 240. In the brush seal device 200, each of the bristles 211 may be inclined in advance before the bristles 211 are welded to be integrated, or may be inclined by bending each of the attachment sections 212 after the linear bristles 211 are welded to be integrated. That is, the bristles 211 may be inclined by a preferable method and at an optional stage based on a condition of such as a manufacturing device or an embodiment to be formed. In some case, the brush portion 123 of the inner circumferential brush seal 220 may be inclined by making each of the bristles 211 inclined in advance, and the brush portion 143 of the outer circumferential brush seal 240 may be inclined after the bristles 211 are integrated.

The brush seal device 200 of the second embodiment has the above-mentioned structure and the like.

In terms of function, effect, and variation of the brush seal device 100 of the first embodiment, all of function, effect, variation and the like are also applicable to the brush seal device 200 of the second embodiment except for something related to the fact that the inner circumferential brush seal 120 and the outer circumferential brush seal 140 are separable. Therefore, in the second embodiment, the following brush seal device can be also provided: Leakage of process fluid from around a rotational shaft and from an outer circumferential side can be prevented; wear of a brush seal, the rotational shaft, or a housing etc. can be prevented; and these function and effect can be properly maintained for a long time.

Note that, in the brush seal device 100 of the first embodiment, as shown in FIGS. 1, 2, and 4, the brush seal 110 is formed by respectively forming the attachment sections 122 and 142 at the inner circumferential brush seal 120 and the outer circumferential brush seal 140, and by combining them as the connection part 112.

On the other hand, in the brush seal device 200, the inner circumferential brush seal 220 and the outer circumferential brush seal 240 are formed by the same bristles 211 in the first place. Thus, as shown in FIG. 5 and FIG. 6, there are no respective attachment sections for the inner circumferential brush seal 220 or the outer circumferential brush seal 240, and there is only the single attachment section 212 as the brush seal 210.

Then, in the brush seal device 200 of the second embodiment, since welding of the bristles is performed at only one portion, the brush seal 210 can be easily manufactured by a small number of steps.

The brush seal 210 manufactured in this way is easy to be handled and preferable because the inner circumferential brush seal 220 and the outer circumferential brush seal 240 are integrated.

The brush seal device 200 of the second embodiment further has such a feature.

Third Embodiment

A brush seal device 300 of the third embodiment of the present invention will be explained in reference to FIG. 8 to FIG. 10.

In the following explanation of the brush seal device 300 of the third embodiment, the same reference number will be also distributed to structures which are substantially the same as those of the brush seal device 100 of the first embodiment mentioned above in reference to FIG. 1 to FIG. 4 or the brush seal device 200 of the second embodiment mentioned above in reference to FIG. 5 to FIG. 7, and the structures will not be explained. In the third embodiment, differences from those of the brush seal device 100 of the first embodiment or the brush seal device 200 of the second embodiment will be mainly explained.

Figure 8:
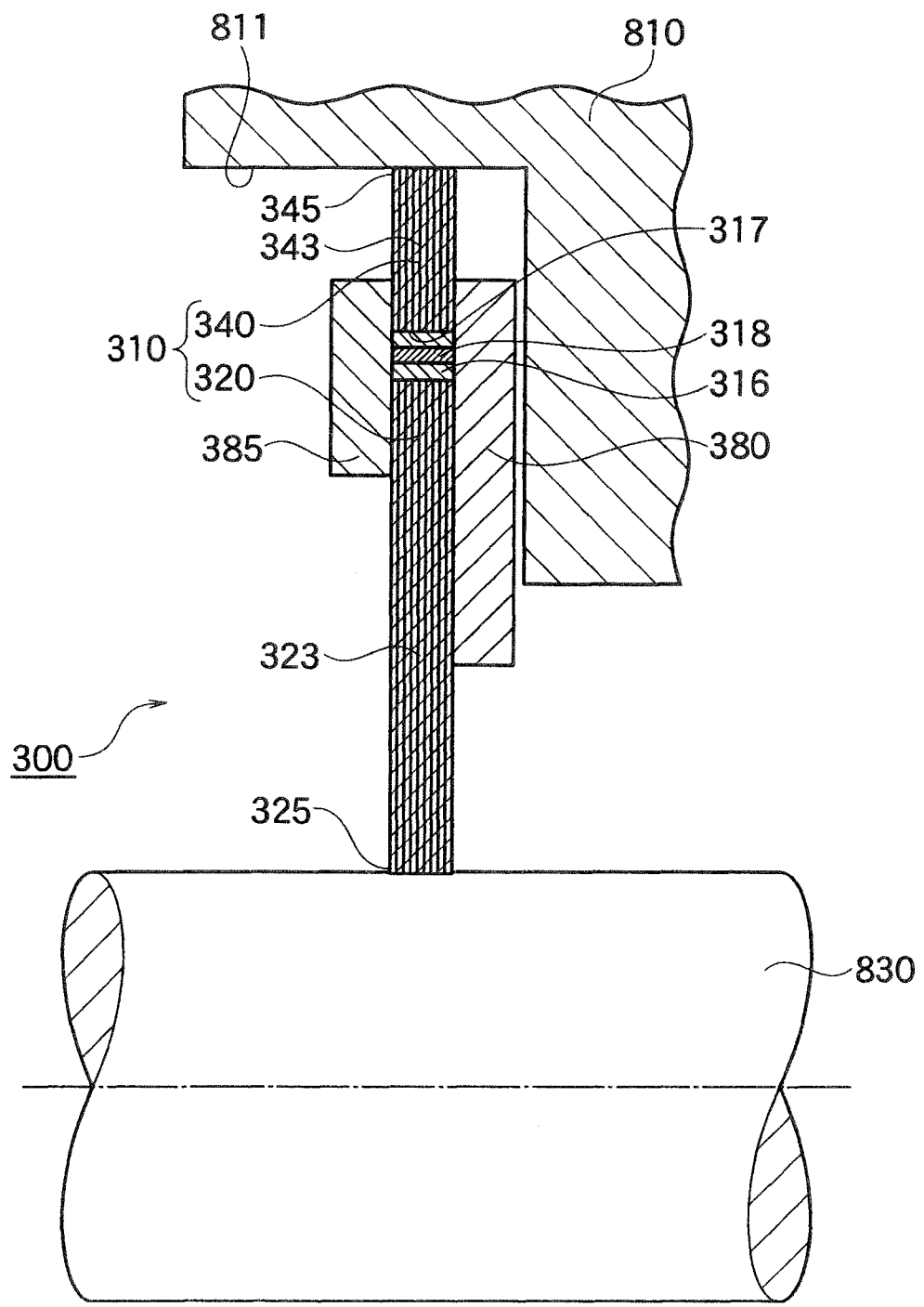
FIG. 8 is a cross sectional view showing a structure of a brush seal device of the third embodiment of the present invention.

As shown in FIG. 8, the brush seal device 300 of the third embodiment basically has the same structures as the brush seal device 100 of the first embodiment and the brush seal device 200 of the second embodiment as well. That is, the brush seal device 300 includes a brush seal 310, a back plate part 380, and a holding part 385. The brush seal 310 includes an inner circumferential brush seal 320 and an outer circumferential brush seal 340. The inner circumferential brush seal 320 has a brush portion 323 and free end portions 325 at the inner circumferential side. The outer circumferential brush seal 340 has a brush portion 343 and free end portions 345 at the outer circumferential side.

First, the brush seal device 300 of the third embodiment is different from the brush seal devices 100 and 200 of the first and second embodiments in the structure of the brush seal 310.

Both the above-mentioned brush seal devices 100 and 200 of the first and second embodiments are formed in a ring shape by bundling the multiple linear bristles 121, 141, or 211, arranging the bundled bristles along the circumference in a wall shape, and combining the outer circumferential side, the inner circumferential side, or the middle part with welding.

Figure 9:
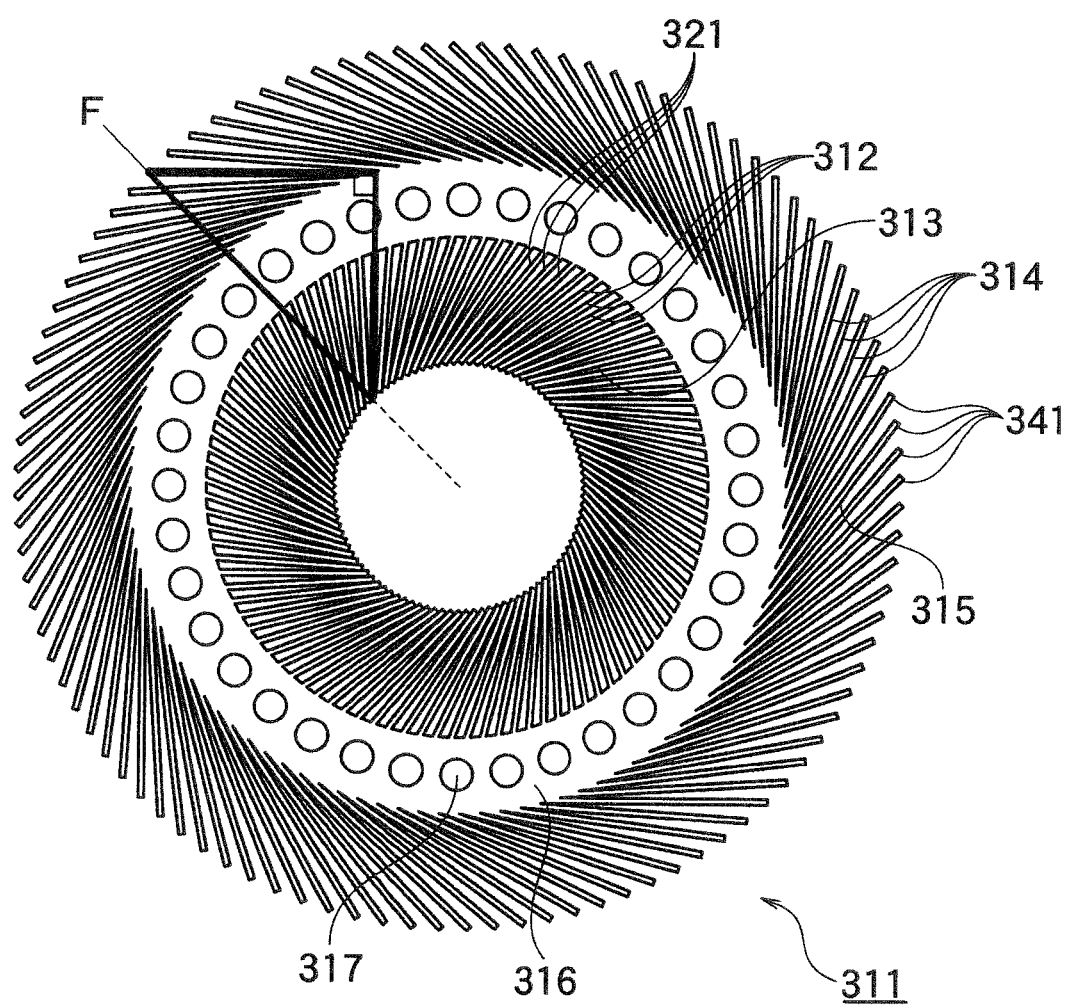
FIG. 9 is a plane view to explain a plate brush seal unit disc providing the brush seal device shown in FIG. 8.

On the other hand, the brush seal device 300 of the third embodiment is formed by laminating thin-annular plate brush seal unit discs 311 as shown in FIG. 9.

The plate brush seal unit disc 311 has a ring shape. The inner circumferential side thereof is processed into slits 312 inclined with respect to the circumferential direction (the direction where the rotational shaft 830 rotates) of the ring-shaped plate brush seal unit disc 311, so that narrow beams 321 are formed among the slits 312 to constitute an inner-circumferential-side plate brush portion 313 as a whole.

The outer circumferential side of the plate brush seal unit disc 311 is processed into slits 314, which are inclined with respect to the circumferential direction (the inner circumferential surface 811 of the housing 810) and are inclined with respect to a direction opposite to that of the inner-circumferential-side slits 312 of the inner circumferential side in the axial direction of the rotational shaft 830, so that narrow beams 341 are formed among the slits 312 to constitute an outer circumferential-side plate brush portion 315 as a whole.

The narrow beams 321 and 341 of the plate brush seal unit disc 311 are bar-shaped (linear, hairy) members having cross sectional shape of rectangle or square whose length of longitudinal and lateral sides is 0.2 to 0.005×0.3 to 0.008 mm, and preferably 0.15 to 0.008×0.2 to 0.01 mm, for example. In addition to rectangle, various shapes such as triangle, trapezoid, or ellipse etc. are used as the cross section of the narrow beams 321 and 341.

Note that, the narrow beams 321 and 341 may be referred as bristles in general.

A ring plate shaped base portion 316 without the slits 312, 314 or the narrow beams 321, 341 is formed between the inner-circumferential-side plate brush portion 313 of the plate brush seal unit disc 311 and the outer circumferential-side plate brush portion 315 thereof. Positioning holes 317 are formed on the base portion 316 along the circumference. The pitch of the positioning holes 317 does not correspond to those (pitches of the slits 312 and 314) of the narrow beams 321 and 341 of the inner-circumferential-side plate brush portion 313 and the outer circumferential-side plate brush portion 315 (the pitch of the positioning holes 317 is not an integral multiple of the pitches of the narrow beams 321 and 341), and is formed to be different slightly. Alternatively, pitch (interval) of the respective positioning holes 317 is formed to be slightly different from each other.

When a plurality of the plate brush seal unit discs 311 are laminated, by shifting and matching the positioning holes 317, the pitch of the positioning holes 317 is differently formed so that the positions of the narrow beams 321 and 341 of the inner-circumferential-side plate brush portion 313 and the outer circumferential-side plate brush portion 315 are slightly displaced by the plate brush seal unit discs 311. Specifically, by properly changing the positioning holes 317 fitted between the plate brush seal unit discs 311, the positions of the narrow beams 321 and 341 are displaced by a fraction of the pitches of the narrow beams 321 and 341.

Thus, when the plurality of the plate brush seal unit discs 311 are laminated to form the brush seal 310 by shifting and matching the positioning holes 317, it is possible to overlap the narrow beams 321 and 341 of other plate brush seal unit discs 311 at the slits 312 and 314 of a certain plate brush seal unit disc 311. This way of laminating the plurality of the plate brush seal unit discs 311 makes it possible to substantially extinguish slits (gaps) going through with respect to the axial direction of the brush seal 310 and to prevent leakage of process fluid effectively, as the whole brush seal 310.

Figure 10A:
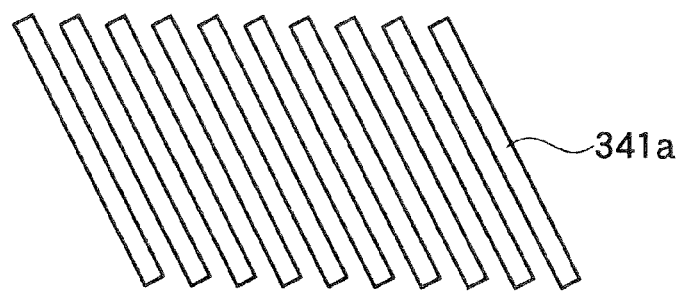
FIG. 10A is a view to explain a method for overlapping narrow beams at an outer circumferential brush seal of the brush seal device shown in FIG. 8, and the view shows a pattern of first narrow beams.
Figure 10B:
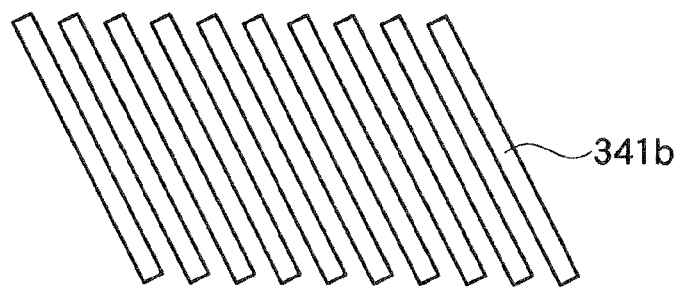
FIG. 10B is a view to explain a method for overlapping narrow beams at an outer circumferential brush seal of the brush seal device shown in FIG. 8, and the view shows a pattern of second narrow beams.
Figure 10C:
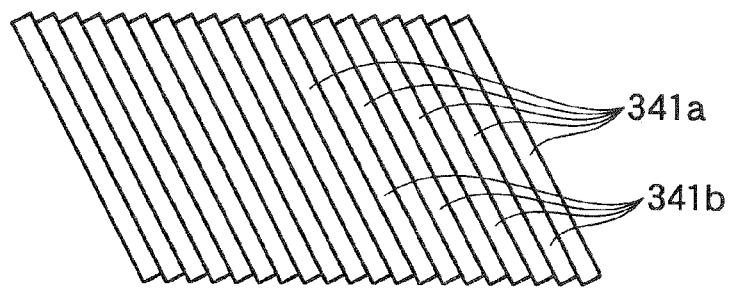
FIG. 10C is a view to explain a method for overlapping narrow beams at an outer circumferential brush seal of the brush seal device shown in FIG. 8, and the view shows a state where the pattern of the first narrow beams shown in FIG. 10A and the pattern of the second narrow beams shown in FIG. 10B are laminated.

For example, in the outer circumferential brush seal 340, by laminating the adjacent plate brush seal unit discs 311 as narrow beams 341a and 341b whose pitches are deviated by half as shown in FIG. 10A and FIG. 10B, it is possible to substantially extinguish slits (gaps) going through the brush seal 310 in the axial direction as shown in FIG. 10C.

A material of the plate brush seal unit discs 311 is steel, stainless, nickel-base alloy, or ceramic material etc. A conventionally known processing method of a fine machining method such as wire electric discharge machining, etching processing, laser processing, or electron beam processing can be applied to the forming of the slits 312, 314 or the positioning holes 317 etc. for the plate brush seal unit discs 311. An additive method forming narrow beams themselves by accumulation can be also applied.

The brush seal 310 of the brush seal device 300 of the third embodiment is formed by laminating the plate brush seal unit discs 311 with such a structure at a necessary laminating thickness or number based on a required seal performance. That is, the plurality of the plate brush seal unit discs 311 are integrated by positioning the plurality of the plate brush seal unit discs 311 to be laminated at a predetermined positional relationship with the positioning holes 317 as mentioned above, and by performing such as welding of the base portion 316.

For example, as shown in FIG. 8, the plurality of the plate brush seal unit discs 311 are joined by inserting a positioning pin 318 into the positioning holes 317, which position the plurality of the plate brush seal unit discs 311. Note that, when the plurality of the plate brush seal unit discs 311 are welded, the positioning pin 318 may be integrally welded as well. This is effective for prevention of falling off.

In the brush seal 310 formed in this way, a welded part of the base portion 316 corresponds to an attachment section (hereinafter, the base portion 316 may be referred as the attachment section 316).

In the brush seal device 300 of the present embodiment, the back plate part 380 and the holding part 385 are integrally formed with the brush seal 310 by holding it therebetween. That is, the back plate part 380, the brush seal 310, and the holding part 385 are welded by centering the attachment section 316 of the brush seal 310 and are combined as in a trinity to form the brush seal device 300.

Here, in the above explanation, the positioning pin 318 is used when the plurality of the plate brush seal unit discs 311 are joined. However, for example, the positioning pin 318 may be stood on the back plate part 380 in advance, and each of the plate brush seal unit discs 311 may be positioned for the positioning pin 318 placed on the back plate part 380 when the plurality of the plate brush seal unit discs 311 are laminated. In this case, a step for laminating the plurality of the plate brush seal unit discs 311 and a step for placing the back plate part 380 or both the back plate part 380 and the holding part 385 are simultaneously performed in substantially the same step. Therefore, the positioning pin 318 may become easy to be handled, and both the step for laminating the plate brush seal unit discs 311 and the step for placing the back plate part 380 and the holding part 385 may become easy steps. The brush seal device 300 may be performed with such a structure and method.

Function, movement, and effect of the brush portions 323, 343 and the free end portions 325, 345 of the inner and outer circumferential brush seals 320, 340 of the brush seal 310 of the brush seal device 300 are the same as those of the brush portions 123, 143 and the free end portions 125, 145 of the inner and outer circumferential brush seals 120, 220 and 140, 240 of the brush seals 110, 210 of the brush seal devices 100, 200 of the first and second embodiments mentioned above.

Note that, in the present embodiment, the brush portions 323, 343 of the inner and outer circumferential brush seals 320, 340 of the brush seal 310 are the same brush portions. That is, the narrow beams 321 consisting the inner circumferential brush seal 320 and the narrow beams 341 consisting the outer circumferential brush seal 340 are consisted to have the same cross sectional shape, size thereof, characteristic such as elastic characteristic, arrangement density, or arrangement form. Note that, since the narrow beams 321 and the narrow beams 341 are formed at the inner and outer circumference of the same plate brush seal unit discs 311, the material thereof is originally the same.

In the brush seal devices 100 and 200 of the first and second embodiments, the brush receiving part 190 is placed where the brush seal devices 100 and 200 of the inner circumferential surface 811 of the housing 810 are placed, which restricts spreading of the outer-circumferential-side free end portions 145 of the bristles 141 and 211 of the outer circumferential brush seals 140 and 240.

On the other hand, in the brush seal device 300 of the third embodiment, the brush receiving part 190 is not provided, and the free end portions 345 of the brush portion 343 of the outer circumferential brush seal 340 are directly contacted to the inner circumferential surface 811 of the housing 810.

Instead, in the brush seal device 300, the back plate part 380 and the holding part 385 hold not only a part of the inner circumferential brush seal 320 of the brush seal 310, but also a part of the outer circumferential brush seal 340 thereof as shown in FIG. 8. That is, in the brush seal device 300, the back plate part 380 and the holding part 385 hold an area therebetween including root portions of the inner circumferential brush seal 320 and the outer circumferential brush seal 340 near the attachment section 316 by centering the attachment section (base portion) 316 as mentioned above. As a result, in the brush seal device 300, the back plate part 380 and the holding part 385 prevent not only spreading of the narrow beams 321 of the inner circumferential brush seal 320, but also spreading of the narrow beams 341 of the outer circumferential brush seal 340. Thus, it is not necessary to provide a member like the brush receiving part 190 at the part of the free end portions 345 of the outer circumferential brush seal 340.

Note that, such an embodiment of holding the root portions of the inner circumferential brush seal 320 and the outer circumferential brush seal 340 with the back plate part 380 and the holding part 385 therebetween can be also applied to the brush seal devices 100 and 200 of the first and second embodiments mentioned above.

In the brush seal device 300 of the present embodiment, as mentioned above in reference to FIG. 9, the narrow beams 341 of the outer circumferential brush seal 340 are inclined with respect to a direction opposite to that of the narrow beams 321 of the inner circumferential brush seal 320 in the radial direction of the rotational shaft 830. In this structure, as shown in FIG. 9, the tilt angle and length of the narrow beams 321 and 341 are adjusted so that spring effect generated by the narrow beams 341 and 321 of the outer and inner circumferential brush seals 340 and 320 remains only as the radial direction element F of the brush seal device 300.

In accordance with such a structure, there is only a force in the radial direction with respect to stress (shaking stress) for such as vibration which the brush seal device 300 receives from the rotational shaft 830. Thus, behavior such as an unstable vibration of the brush seal device 300 can be prevented, and the movement of the brush seal device 300 can be stabilized.

Note that, the features of the tilt angle and length of the narrow beams 321 and 341 can be also applied to a relation of the bristles 121, 141 of the inner and outer circumferential brush seals 120, 140 of the brush seal device 100 of the first embodiment mentioned above, and to a relation of the bristles 211 of the inner and outer circumferential brush seals 220, 240 of the above-mentioned second embodiment.

The brush seal device 300 of the third embodiment has such a structure.

Therefore, in the third embodiment, the following brush seal device can be also provided: Leakage of process fluid from around a rotational shaft and from an outer circumferential side can be prevented; wear of a brush seal, the rotational shaft, or a housing etc. can be prevented; and these function and effect can be properly maintained for a long time.

Note that, in the present embodiment, the brush portions 323, 343 of the inner and outer circumferential brush seals 320, 340 of the brush seal 310 are the same brush portions. However, even if the inner and outer circumferential brush seals 320, 340 consist of the narrow beams 321, 341 formed at the inner and outer circumferences of the same plate brush seal unit disc 311, they can be consisted as different brush portions. Specifically, they become different brush portions by processing the narrow beams 321 constituting the inner circumferential brush seal 320 and the narrow beams 341 constituting the outer circumferential brush seal 340 to have different cross sectional shape, size of cross section, characteristic such as elastic characteristic, arrangement density, or arrangement form etc.

In accordance with the above-mentioned constitution, in spite of forming the narrow beams 321 for the inner circumferential brush seal 320 and the narrow beams 341 for the outer circumferential brush seal 340 at the inner and outer circumferences of the single plate brush seal unit disc 311, it is possible to constitute brush portions 323, 343 having various movement conditions and movement characteristics as the inner and outer circumferential brush seals 320, 340 and to form the brush portions 323, 343 having optimal conditions respectively. As a result, it is possible to provide a brush seal device which is applicable to a wider technical field and performs a higher performance.

In the present embodiment, both the inner circumferential brush seal 320 and the outer circumferential brush seal 340 are formed on the single plate brush seal unit disc 311, and the plate brush seal unit discs 311 with them are laminated. However, as with the brush seal device 100 of the first embodiment, the inner circumferential brush seal 320 and the outer circumferential brush seal 340 may be formed with separate thin plates. That is, patterns corresponding to the inner circumferential brush seal 320 and the outer circumferential brush seal 340 may be formed with separate thin plates in order to separately make the inner circumferential brush seal 320 and the outer circumferential brush seal 340 with lamination of the respective thin plate unit sheets and to connect them in the same way as the brush seal device 100 of the first embodiment, so that the brush seal device 300 is obtained.

When the inner circumferential brush seal 320 and the outer circumferential brush seal 340 are separately constituted in that way, the inner circumferential brush seal 320 and the outer circumferential brush seal 340 may be the same brush portions or may have different brush portions at the inner circumferential side and the outer circumferential side.

Further, when the inner circumferential brush seal 320 and the outer circumferential brush seal 340 are separately formed (even when they have the same or different brush portions), they may be integrated in advance before the brush seal device 300 is placed in the housing 810, or may be separated until the brush seal device 300 is placed in the housing 810 and be integrated when they are placed in the housing 810 (when they are assembled).

Fourth Embodiment

A brush seal device of the fourth embodiment of the present invention will be explained in reference to FIG. 11 to FIG. 13.

The brush seal device of the fourth embodiment will be explained as a variation of the brush seal device 300 of the third embodiment. Thus, the same reference number will be distributed to substantially the same structures as the brush seal device 300 etc. of the third embodiment, and the structures will not be explained.

In the brush seal device 300 mentioned above as the third embodiment, the brush seal 310 is constituted by laminating the same plate brush seal unit discs 311. However, the brush seal 310 may be constituted by laminating different types of the plate brush seal unit discs 311.

Especially, the brush seal 310 is formed by laminating various types of the plate brush seal unit discs 311 having different forms of the narrow beams 341 of the outer circumferential brush seal 340, which can reduce the clearance in the axial direction of the brush portion 343 of the outer circumferential brush seal 340.

Figure 11A:
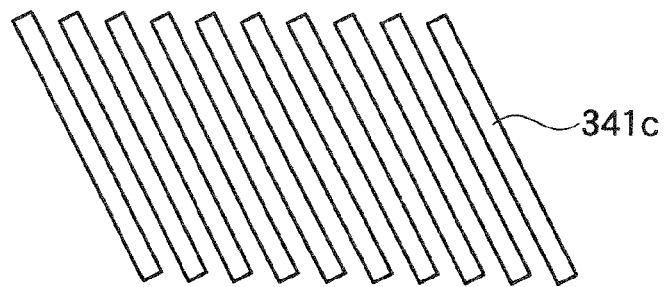
FIG. 11A is a view showing a first example of overlapping of narrow beams at an outer circumferential brush seal as a brush seal device of the fourth embodiment of the present invention, and the view shows a pattern of first narrow beams.
Figure 11B:
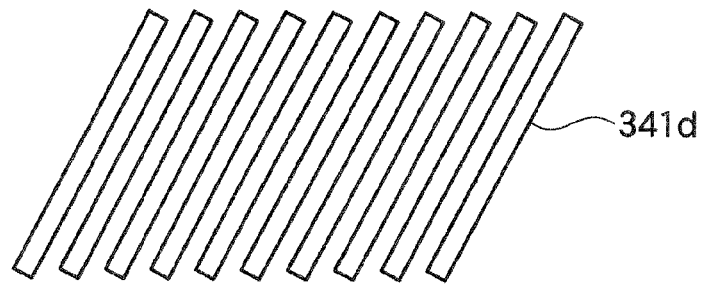
FIG. 11B is a view showing a first example of overlapping of narrow beams at an outer circumferential brush seal as a brush seal device of the fourth embodiment of the present invention, and the view shows a pattern of second narrow beams.
Figure 11C:
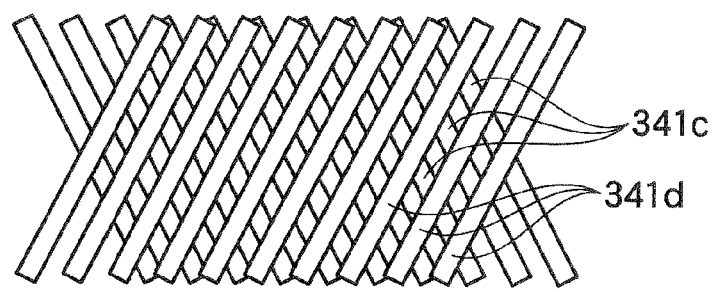
FIG. 11C is a view showing a first example of overlapping of narrow beams at an outer circumferential brush seal as the brush seal device of the fourth embodiment of the present invention, and the view shows a state where the pattern of the first narrow beams shown in FIG. 11A and the pattern of the second narrow beams shown in FIG. 11B are laminated.

For example, as shown in FIG. 11A and FIG. 11B, two types of the plate brush seal unit discs 311 having narrow beams 341c, 341d whose inclined directions are different are laminated, which makes the brush portion 343 of the outer circumferential brush seal 340 have a form as shown in FIG. 11C and makes the clearance in the axial direction smaller.

Figure 12A:
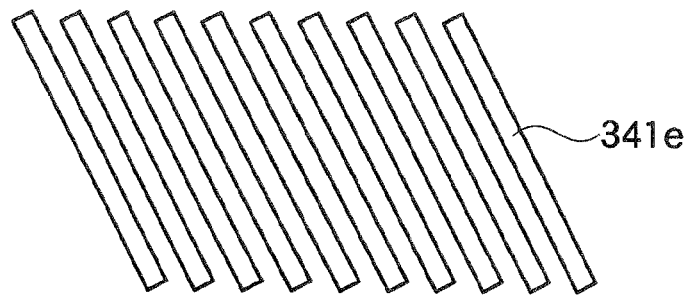
FIG. 12A is a view showing a second example of overlapping of narrow beams at an outer circumferential brush seal as the brush seal device of the fourth embodiment of the present invention, and the view shows a pattern of first narrow beams.
Figure 12B:
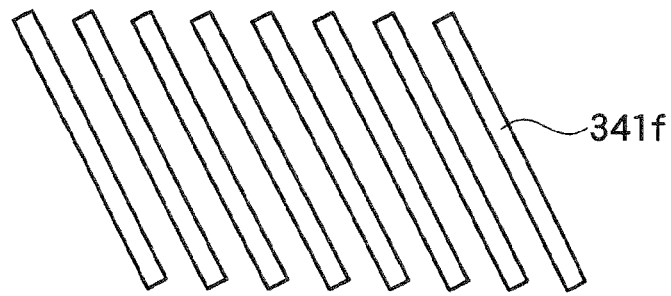
FIG. 12B is a view showing a second example of overlapping of narrow beams at an outer circumferential brush seal as the brush seal device of the fourth embodiment of the present invention, and the view shows a pattern of second narrow beams.
Figure 12C:
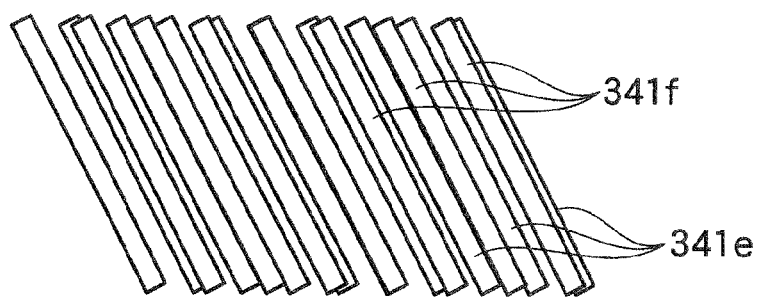
FIG. 12C is a view showing a second example of overlapping of narrow beams at an outer circumferential brush seal as the brush seal device of the fourth embodiment of the present invention, and the view shows a state where the pattern of the first narrow beams shown in FIG. 12A and the pattern of the second narrow beams shown in FIG. 12B are laminated.

As shown in FIG. 12A and FIG. 12B, two types of the plate brush seal unit discs 311 having narrow beams 341e, 341f whose pitches are different, which makes the brush portion 343 of the outer circumferential brush seal 340 have a form as shown in FIG. 12C and makes the clearance in the axial direction smaller in this structure as well.

Figure 13A:
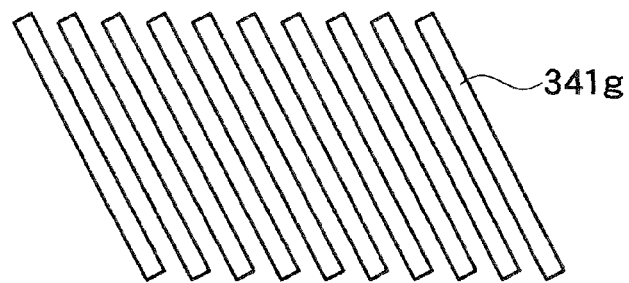
FIG. 13A is a view showing a third example of overlapping of narrow beams at an outer circumferential brush seal as the brush seal device of the fourth embodiment of the present invention, and the view shows a pattern of first narrow beams.
Figure 13B:
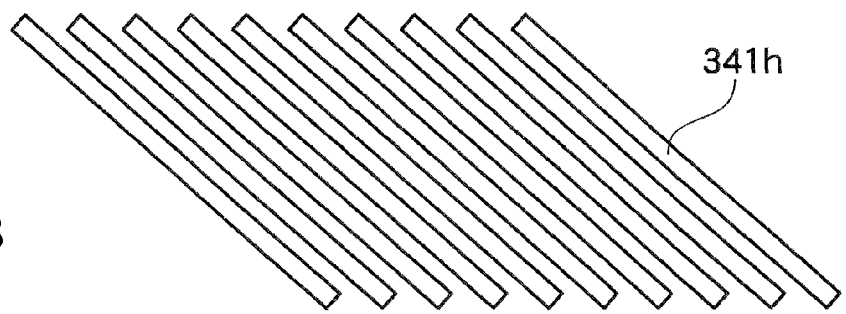
FIG. 13B is a view showing a third example of overlapping of narrow beams at an outer circumferential brush seal as the brush seal device of the fourth embodiment of the present invention, and the view shows a pattern of second narrow beams.
Figure 13C:
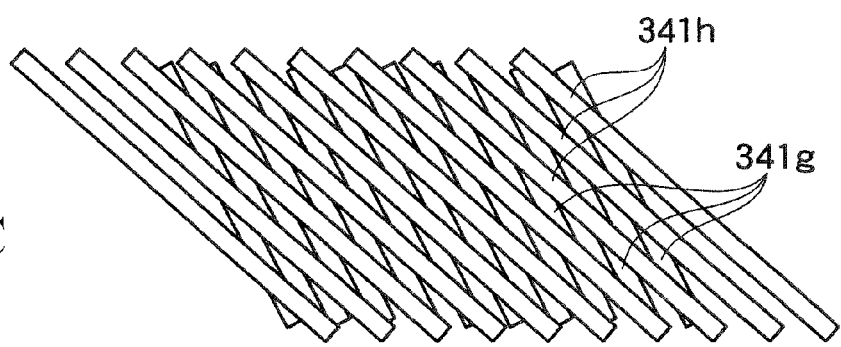
FIG. 13C is a view showing a third example of overlapping of narrow beams at an outer circumferential brush seal as the brush seal device of the fourth embodiment of the present invention, and the view shows a state where the pattern of the first narrow beams shown in FIG. 13A and the pattern of the second narrow beams shown in FIG. 13B are laminated.

Further, as shown in FIG. 13A and FIG. 13B, two types of the plate brush seal unit discs 311 having narrow beams 341g and narrow beams 341h whose tilt angles are different, which makes the brush portion 343 of the outer circumferential brush seal 340 have a form as shown in FIG. 13C and makes the clearance in the axial direction smaller in this structure as well.

Since the clearance in the axial direction of the narrow beams 341 of the outer circumferential brush seal 340 becomes small in all the structures, it is possible to reduce or prevent the leakage of process fluid around the outer circumference of the brush seal device 300, and this is preferable.

The brush seal device of the fourth embodiment has such a structure.

Function, effect, variation or the like regarding the brush seal device of the respective embodiments mentioned above is also applicable to the brush seal device explained as the fourth embodiment. Therefore, in the fourth embodiment, the following brush seal device can be also provided: Leakage of process fluid from around a rotational shaft and from an outer circumferential side can be prevented; wear of a brush seal, the rotational shaft, or a housing etc. can be prevented; and these function and effect can be properly maintained for a long time.

Note that, in order to have different forms of the narrow beams 341, there are various methods and forms in addition to the above, and an optional method may be applied.

The structure is not limited to a form which narrow beams are formed on plate brush seal unit discs and they are laminated. The structure is also applicable to one forming an outer circumferential brush seal with the bristles explained as the first and second embodiments.

The same method is also applicable to the inner circumferential brush seal 320. In that structure, it is possible to reduce or prevent the leakage of process fluid at the brush portion 323 of the inner circumferential brush seal 320, and this is preferable.

Fifth Embodiment

The fifth embodiment of the present invention will be explained in reference to FIG. 14 to FIG. 16.

In the following explanation regarding a brush seal device 500 of the fifth embodiment, the same reference number will be distributed to structures which are substantially the same as those of the brush seal devices of each embodiment mentioned above, and the structures will not be explained.

In the brush seal devices of each embodiment mentioned above, the inner circumferential brush seals 120, 220, 320 and the outer circumferential brush seals 140, 240, 340 are provided so that a direction of the bristles 121, 141, 221 or the narrow beams 321, 341 is along the radial direction of the rotational shaft 830.

On the other hand, the brush seal device 500 of the fifth embodiment provides an outer circumferential brush seal 540 inclined in the axial direction.

Hereinafter, the brush seal device 500 of the fifth embodiment will be explained in detail in reference to the figures.

Figure 14:
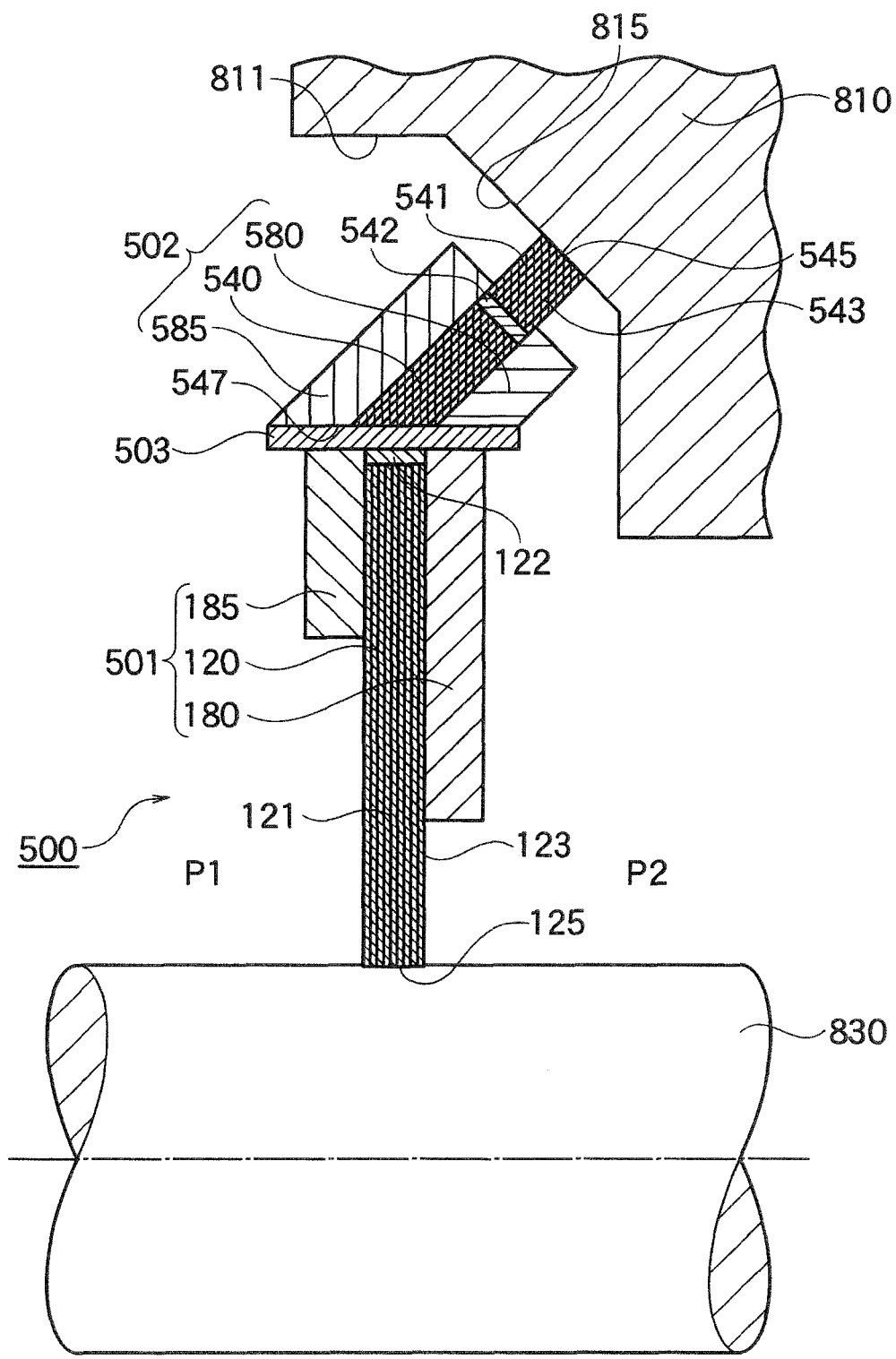
FIG. 14 is a cross sectional view showing a structure of a brush seal device of the fifth embodiment of the present invention.

As shown in FIG. 14, the brush seal device 500 of the present embodiment is also one which separates the gap between the housing 810 of such as a gas turbine and the rotational shaft 830 to a higher pressure side P1 and a lower pressure side P2, for example.

The brush seal device 500 is attached on an inclined surface 815, which is provided on the inner circumferential surface 811 of the housing 810. The inclined surface 815 is a surface inclined with respect to the inner circumferential surface 811 at approximately 45 degrees.

The brush seal device 500 has an inner circumferential brush seal part 501, an outer circumferential brush seal part 502, and a connection part 503. The inner circumferential brush seal part 501 has the inner circumferential brush seal 120, the back plate part 180, and the holding part 185. Also, the outer circumferential brush seal part 502 has an outer circumferential brush seal 540, a back plate part 580, and a holding part 585.

The inner circumferential brush seal 120, the back plate part 180, and the holding part 185 are the same as each structure to which the same number of the brush seal device 100 of the first embodiment is distributed. In the brush seal device 500, they are integrally constituted as the inner circumferential brush seal part 501.

The outer circumferential brush seal 540 of the outer circumferential brush seal part 502 has approximately the same structure as the outer circumferential brush seal 140 of the brush seal device 100 of the first embodiment. However, the entire shape thereof is not a plain annular shape like the outer circumferential brush seal 140 of the first embodiment, but is a truncated conical body (a truncated cone) shape as shown in FIG. 15 and FIG. 16. That is, the outer circumferential brush seal 540 is formed into a truncated shape by bundling the multiple linear bristles 541, arranging the bundled bristles 541 along the truncated cone side circumferential shape in a wall shape, and combining a middle part 542 with welding. Then, the outer circumferential side of the welding part 542 is formed at a brush portion 543, and outer-circumferential-side free end portions 545 are formed at the tip thereof. The outer-circumferential-side free end portions 545 are contacted to the inclined surface 815 of the housing 810, and seal between the higher pressure side P1 and the lower pressure side P2.

The outer circumferential brush seal 540 is held by the back plate part 580 and the holding part 585 therebetween and is integrated therewith to obtain the outer circumferential brush seal part 502.

The back plate part 580 is a member which has the same truncated conical shape (a truncated cone) as the outer circumferential brush seal 540 and is placed at the lower pressure side P2 of the outer circumferential brush seal 540. The back plate part 580 supports the bristles 541 of the outer circumferential brush seal 540 from the lower pressure side P2.

The holding part 585 is a member which has the same truncated conical shape (a truncated cone) as the outer circumferential brush seal 540 and is placed at the higher pressure side P1 of the outer circumferential brush seal 540. The holding part 585 is a member for holding the outer circumferential brush seal 540 with the back plate part 580.

The material of the back plate part 580 and the holding part 585 is the same as that of the back plate part 180 and the holding part 185 or so of the first embodiment.

The back plate part 580 and the holding part 585 are arranged to hold the outer circumferential brush seal 540 therebetween, and are welded by centering the welding part 542 of the middle of the outer circumferential brush seal 540. Then, they are combined as in a trinity.

The combined back plate part 580, outer circumferential brush seal 540, and holding part 585 become a surface parallel to the rotational shaft 830 by cutting the inner circumferential side thereof to form the outer circumferential brush seal part 502. A ring space 547 of the inner circumferential side is a mounting part of the inner circumferential brush seal part 501. The inner side ring space 547 of the outer circumferential brush seal part 502 is formed to have the inner diameter which is approximately the same as the outer circumference of the inner circumferential brush seal part 501 so that the inner circumferential brush seal part 501 can be engaged inside thereof.

Figure 15:
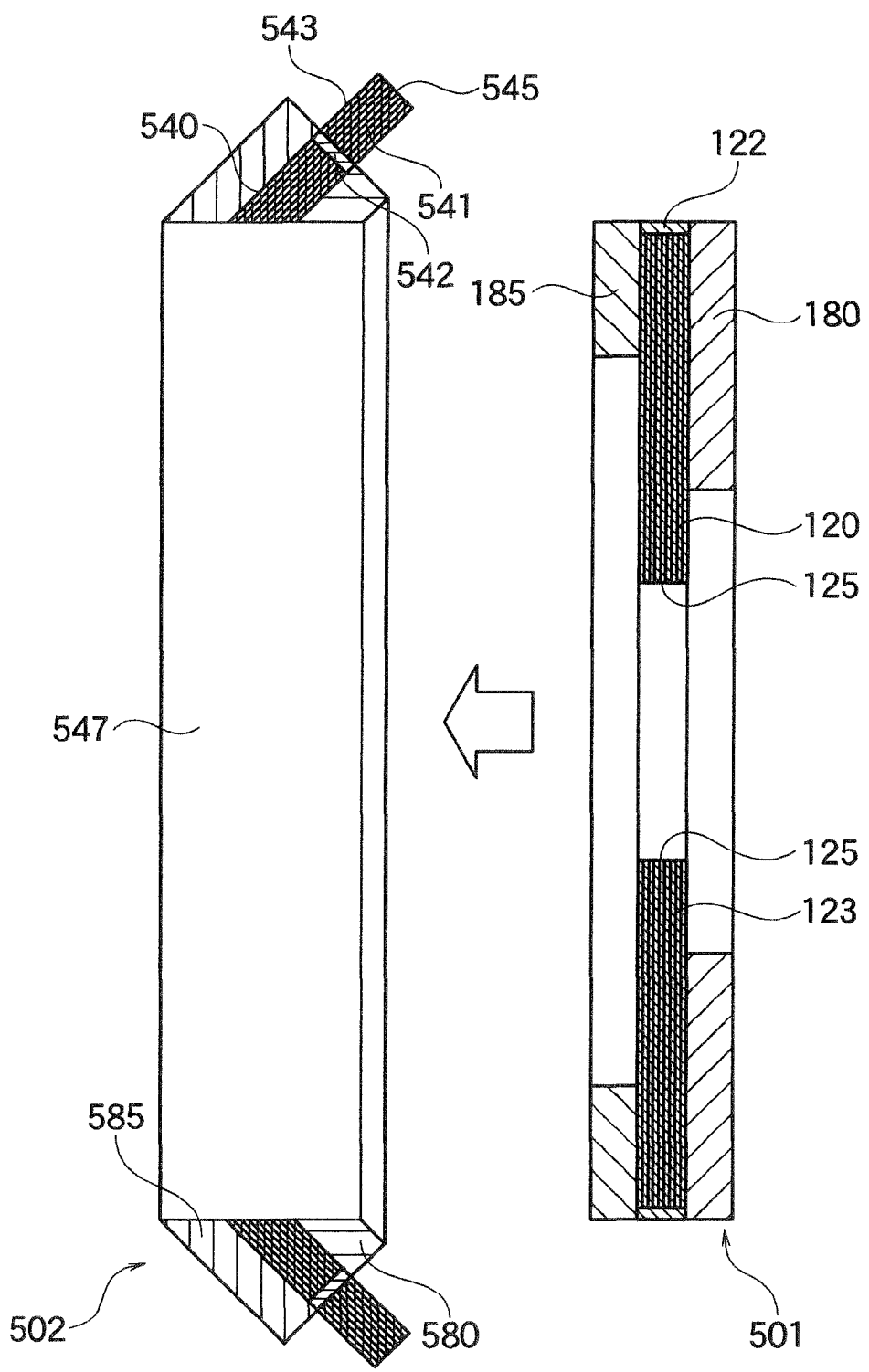
FIG. 15 is a first view showing a state where an inner circumferential brush seal part is engaged to an outer circumferential brush seal part in the brush seal device shown in FIG. 14.
Figure 16:
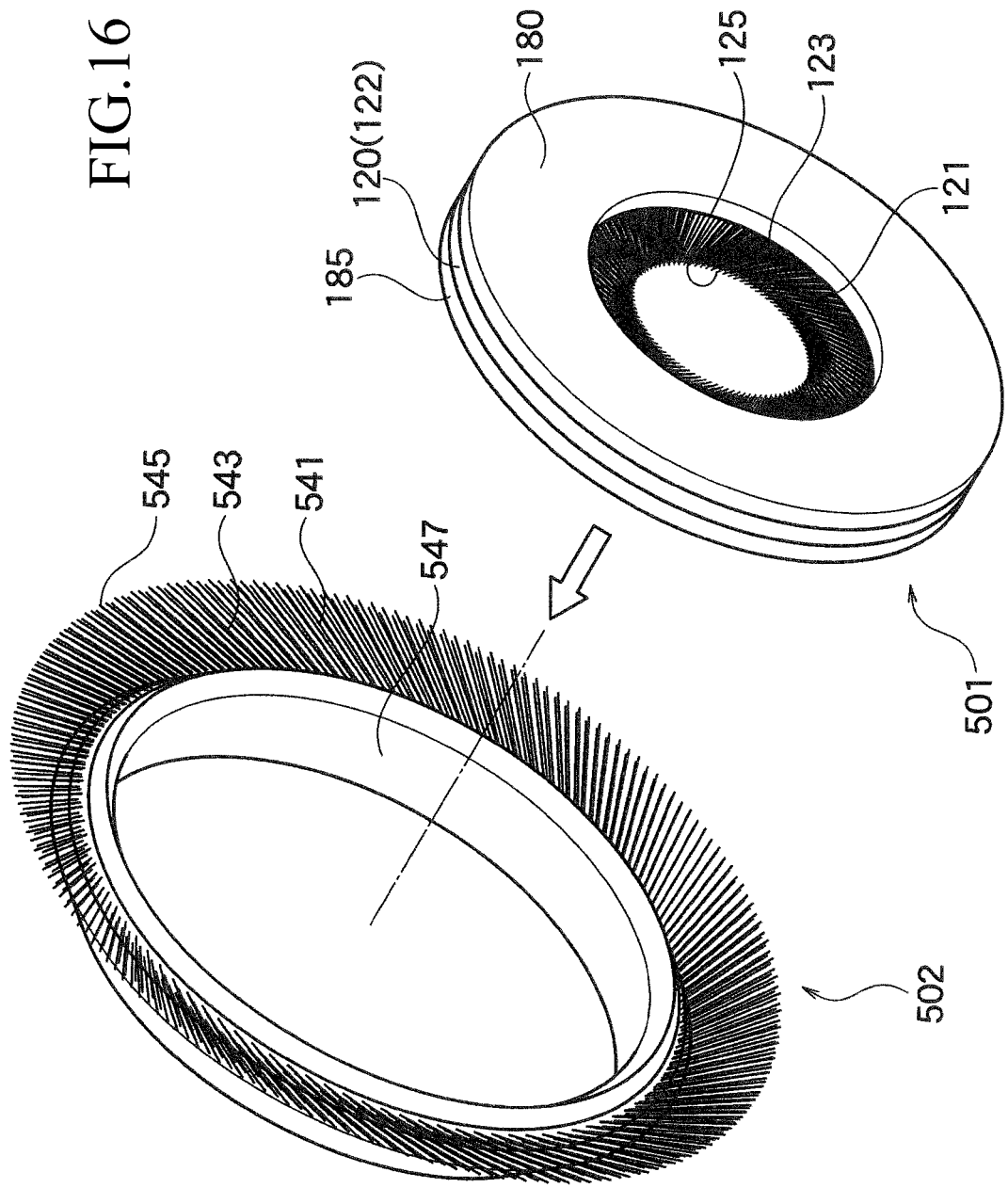
FIG. 16 is a second view showing a state where an inner circumferential brush seal part is engaged to an outer circumferential brush seal part in the brush seal device shown in FIG. 14.

Then, as shown in FIG. 15, the brush seal 500 is constituted by engaging and placing the inner circumferential brush seal part 501 into the inner-circumferential-side ring space 547 of the outer circumferential brush seal part 502. The outer circumferential brush seal part 502 and the inner circumferential brush seal part 501 are integrated by joining the inner circumferential surface and the outer circumferential surface as the connection part 503 with welding or so, so that the brush seal device 500 is obtained.

In the brush seal device 500 constituted in this way, the inner circumferential brush seal 120 of the inner circumferential brush seal part 501 is placed to be closed to the outer circumferential surface 831 of the rotational shaft 830, and the outer circumferential brush seal 540 of the outer circumferential brush seal part 502 is placed to be contacted to the inclined surface 815 of the housing 810.

Function, movement, and effect of the brush portions 123, 543 and the free end portions 125, 545 of the inner and outer circumferential brush seals 120, 540 of the inner and outer circumferential brush seal parts 501, 502 of the brush seal device 500 are the same as those of the brush seal devices of each embodiment mentioned above. However, especially in the brush seal device 500, the outer circumferential brush seal 540 of the outer circumferential brush seal part 502 is provided to be inclined with respect to the axial direction of the rotational shaft 830. Thus, the brush seal device 500 can follow not only the movement in the radial direction of the rotational shaft 830, but also the movement in the axial direction.

The brush seal device of the fifth embodiment has such a structure.

All of function, effect, variation and the like of the brush seal device of the respective embodiments mentioned above are also applicable to the brush seal device 500 of the fifth embodiment. Therefore, in the fifth embodiment, the following brush seal device can be also provided; Leakage of process fluid from around a rotational shaft and from an outer circumferential side can be prevented; wear of a brush seal, the rotational shaft, or a housing etc. can be prevented; and these function and effect can be properly maintained for a long time.

As mentioned above, in the brush seal device 500 of the present embodiment, where the outer circumferential brush seal 540 is inclined with respect to the axial direction of the rotational shaft 830, it is possible to provide the following brush seal device: Displacement in the axial direction of the brush seal device 500 and the rotational shaft 830 can be accepted or, in other words, displacement in the axial direction can be followed; a more stable operation can be performed, and as a result, leakage of process fluid can be more securely prevented; wear of each part can be prevented; and a long term use is possible.

Note that, in the present embodiment, the inner and outer circumferential brush seals 120, 540 with the bristles 121, 541 are exemplified, but a brush seal constituted by laminating plate brush seal unit discs as the third embodiment may be used.

In the present embodiment, the outer circumferential brush seal 540 is inclined at 45 degrees, but it may be inclined at an optional degree based on an application target, pressure of process fluid, strength of burden in each direction, vibration, form or size of displacement, or the like.

Sixth Embodiment

The sixth embodiment of the present invention will be explained in reference to FIG. 17.

In the following explanation regarding a brush seal device 600 of the sixth embodiment, the same reference number will be also distributed to structures which are substantially the same as those of the brush seal devices of each of the above-mentioned embodiments, and the structures will not be explained, either.

The brush seals of each embodiment mentioned above are constituted by commonly using either an embodiment of bundling and welding the bristles or an embodiment of laminating plate brush seal unit discs as the inner and outer circumferential brush seals. However, the inner and outer circumferential brush seals may employ different embodiments. In the present embodiment, the brush seal device 600, which uses both a brush seal with the laminated plate brush seal unit discs as the inner circumferential brush seal and a brush seal with bristles as the outer circumferential brush seal, will be explained.

As shown in FIG. 17, the brush seal device 600 has a brush seal 610, which an inner circumferential brush seal 620 is engaged in the outer circumferential brush seal 140.

Note that, here, the brush seal 610 is only illustrated, and structures such as a back plate part or a holding part will not be illustrated.

In the brush seal device 600, the outer circumferential brush seal is the same as the outer circumferential brush seal 140 of the brush seal device 100 of the first embodiment.

The inner circumferential brush seal 620 is a brush seal composed by laminating a portion inner than the base portion (attachment section) 316 of the plate brush seal unit discs 311, which is explained in reference to FIG. 9 as the third embodiment. Note that, an attachment section 622 is formed on the outer circumference of the inner circumferential brush seal 620.

The ring space 147 to be inside of the attachment section 142 of the outer circumferential brush seal 140 is a mounting part of the inner circumferential brush seal 620. The inner-side ring space 147 of the outer circumferential brush seal 140 is formed to have approximately the same inner diameter as the outer circumference of the inner circumferential brush seal 620 so that the inner circumferential brush seal 620 can be engaged inside thereof. In other words, the inner circumferential brush seal 120 is formed to have approximately the same outer diameter as the inner diameter of the inner-side ring space 147 of the outer circumferential brush seal 140 for engaging with the ring space 147 thereof.

Then, as shown in FIG. 17, the brush seal 610 (brush seal device 600) is constituted by engaging and placing the inner circumferential brush seal 620 in the ring space 147 of the outer circumferential brush seal 140. The outer circumferential brush seal 140 and the inner circumferential brush seal 620 are integrated by joining the attachment section 142 and the attachment section 622 as a connection part with welding or so to form the brush seal 610.

The brush seal device 600 of the sixth embodiment has such a structure.

Function, effect, variation or the like regarding the brush seal device of the respective embodiments mentioned above is also applicable to the brush seal device 600 explained as the sixth embodiment. Therefore, in the sixth embodiment, the following brush seal device can be also provided: Leakage of process fluid from around a rotational shaft and from an outer circumferential side can be prevented; wear of a brush seal, the rotational shaft, or a housing etc. can be prevented; and these function and effect can be properly maintained for a long time.

Especially, the brush seal device 600 of the present embodiment uses both the brush seal, where plate brush seal unit discs are laminated, as the inner circumferential brush seal 620 and the brush seal formed with bristles as the outer circumferential brush seal 140. In this way, by combining optional brush seals, it is possible to form brush portions having various movement conditions and movement characteristics and to form brush portions having optimal conditions respectively as the inner and outer circumferential brush seals. As a result, it is possible to provide a brush seal device which is applicable to a wider technical field and performs a higher performance.

Note that, the present invention is not limited to the embodiments mentioned above, but can be variously changed within a scope thereof.

INDUSTRIAL APPLICATION FIELD

The brush seal device according to the present invention can be preferably used for an optional device having a rotational shaft of aircrafts, gas turbines and the like.

The invention claimed is:

1. A brush seal device having a brush portion in which a plurality of bristles are arranged and sealing in an axial direction between a housing and a rotational shaft, the brush seal device comprising:
   an inner circumferential brush seal;
   an outer circumferential brush seal; and
   a connection part, wherein
   said inner circumferential brush seal comprises:
   an inner-circumferential-side brush portion in which a plurality of bristles are arranged from the connection part to an inner circumferential direction; and
   an inner-circumferential-side free end portion which is an inner-circumferential-side end portion of the inner-circumferential-side brush portion and is arranged opposite to an outer circumferential surface of the rotational shaft so as to contact or be adjacent to the outer circumferential surface, and
   said outer circumferential brush seal comprises:
   an outer-circumferential-side brush portion in which a plurality of bristles are arranged from the connection part to an outer circumferential direction; and
   an outer-circumferential-side free end portion which is an outer-circumferential-side end portion of the outer-circumferential-side brush portion and is arranged opposite to an inner circumferential surface of the housing so as to contact or be adjacent to the inner circumferential surface, wherein
   a plurality of plate brush seal unit discs are integrally formed by axially laminating themselves to configure at least one of said inner circumferential brush seal and said outer circumferential brush seal, each of said plate brush seal unit discs having narrow beams extending from the connection part as the bristles.

2. The brush seal device as set forth in claim 1 comprises plate brush seal unit discs laminated, wherein the plate brush seal unit disc comprises:
   the inner circumferential brush seal provided with the inner-circumferential-side free end portion and the inner-circumferential-side plate brush portion having narrow beams as the bristles extending from the connection part to an inner circumferential side and inclined with respect to a circumferential direction of the plate brush seal unit disc;
   the outer circumferential brush seal provided with the outer-circumferential-side free end portion and the outer-circumferential-side plate brush portion having narrow beams as the bristles extending from the connection part to an outer circumferential side and inclined with respect to a circumferential direction of the plate brush seal unit disc; and
   a base portion in which the connection parts of the inner circumferential brush seal and the outer circumferential brush seal are formed integrally.

3. The brush seal device as set forth in claim 1, wherein
   a plurality of the bristles of the inner-circumferential-side brush portion of the inner circumferential brush seal are arranged to be inclined with respect to a radial direction,
   a plurality of the bristles of the outer-circumferential-side brush portion of the outer circumferential brush seal are arranged to be inclined with respect to a radial direction, and
   the bristles of the inner circumferential brush seal and the bristles of the outer circumferential brush seal are inclined oppositely with respect to the radial direction.

4. The brush seal device as set forth in claim 1, wherein
   the outer circumferential brush seal is formed to be inclined with respect to the axial direction of the rotational shaft.

5. A brush seal device having a brush portion in which a plurality of bristles are arranged and sealing in an axial direction between a housing and a rotational shaft, the brush seal device comprising:
   an inner circumferential brush seal;
   an outer circumferential brush seal; and
   a connection part, wherein
   said inner circumferential brush seal comprises:
   an inner-circumferential-side brush portion in which a plurality of bristles are arranged from the connection part to an inner circumferential direction; and
   an inner-circumferential-side free end portion which is an inner-circumferential-side end portion of the inner-circumferential-side brush portion and is arranged opposite to an outer circumferential surface of the rotational shaft so as to contact or be adjacent to the outer circumferential surface, and
   said outer circumferential brush seal comprises:
   an outer-circumferential-side brush portion in which a plurality of bristles are arranged from the connection part to an outer circumferential direction; and
   an outer-circumferential-side free end portion which is an outer-circumferential-side end portion of the outer-circumferential-side brush portion and is arranged opposite to an inner circumferential surface of the housing so as to contact or be adjacent to the inner circumferential surface, wherein
   middle parts of a plurality of wire members bundled and arranged in a wall shape along a circumference are welded, and the wire members are combined to one another to form a ring shape, so that an outer side of the welding parts is defined as the outer circumferential brush seal, and an inner side of the welding parts is defined as the inner circumferential brush seal.

6. The brush seal device as set forth in claim 5, wherein
   a plurality of the bristles of the inner-circumferential-side brush portion of the inner circumferential brush seal are arranged to be inclined with respect to a radial direction,
   a plurality of the bristles of the outer-circumferential-side brush portion of the outer circumferential brush seal are arranged to be inclined with respect to a radial direction, and
   the bristles of the inner circumferential brush seal and the bristles of the outer circumferential brush seal are inclined oppositely with respect to the radial direction.

7. The brush seal device as set forth in claim 5, further comprising:
a brush receiving part placed on the inner circumferential surface of the housing so as to contact or be adjacent to the outer-circumferential-side free end portion of the outer circumferential brush seal and to restrict a spreading out in an axial direction of the outer-circumferential-side free end portion of the outer circumferential brush seal.

8. The brush seal device as set forth in claim 5, wherein the outer circumferential brush seal is formed to be inclined with respect to the axial direction of the rotational shaft.

* * * * *